US011808903B2

(12) United States Patent
Beam et al.

(10) Patent No.: US 11,808,903 B2
(45) Date of Patent: Nov. 7, 2023

(54) SEISMIC DATA INTERPRETATION SYSTEM

(71) Applicant: Schlumberger Technology Corporation, Sugar Land, TX (US)

(72) Inventors: Michael Beam, Spring, TX (US); Gilles Besançon, Houston, TX (US); Cyril Lagrange, Gatwick (GB); Jan Dolejší, Gatwick (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 4 days.

(21) Appl. No.: 17/052,695

(22) PCT Filed: May 10, 2019

(86) PCT No.: PCT/US2019/031641
§ 371 (c)(1),
(2) Date: Nov. 3, 2020

(87) PCT Pub. No.: WO2019/222031
PCT Pub. Date: Nov. 21, 2019

(65) Prior Publication Data
US 2021/0239869 A1 Aug. 5, 2021

Related U.S. Application Data

(60) Provisional application No. 62/670,803, filed on May 13, 2018, provisional application No. 62/670,737, filed on May 12, 2018.

(51) Int. Cl.
*G01V 1/28* (2006.01)
*G06F 9/50* (2006.01)
(Continued)

(52) U.S. Cl.
CPC ............... *G01V 1/28* (2013.01); *G06F 9/50* (2013.01); *G06F 9/5027* (2013.01);
(Continued)

(58) Field of Classification Search
CPC ........ G01V 1/28; G01V 2210/70; G06F 9/50; G06F 9/5027; G06F 9/5061; G06F 9/54; G06Q 10/0631
See application file for complete search history.

(56) References Cited

U.S. PATENT DOCUMENTS

| 4,642,782 A | 2/1987 | Kemper |
| 6,516,891 B1 | 2/2003 | Dallas |

(Continued)

FOREIGN PATENT DOCUMENTS

| WO | 2017070025 A1 | 4/2014 |
| WO | 2016172031 A1 | 10/2016 |

(Continued)

OTHER PUBLICATIONS

Extended Search Report issued in European Patent Application 19802620.5 dated Jan. 3, 2022, 12 pages.

(Continued)

*Primary Examiner* — John C Kuan
(74) *Attorney, Agent, or Firm* — Jeffrey D. Frantz

(57) ABSTRACT

A method can include receiving a digital operational plan that specifies computational tasks for seismic workflows, that specifies computational resources and that specifies execution information; dispatching instructions that provision the computational resources for one of the computational tasks for one of the seismic workflows; issuing a request for the execution information; receiving the requested execution information during execution of the one of the computational tasks using the provisioned computational resources; and, based on the received execution information indicating that the execution of the one of the computational tasks deviates from the digital operational plan, dispatching at least one additional instruction that provisions at least one additional computational resource for (Continued)

the one of the computational tasks for the one of the seismic workflows.

20 Claims, 23 Drawing Sheets

(51) Int. Cl.
  *G06F 9/54* (2006.01)
  *G06Q 10/0631* (2023.01)
(52) U.S. Cl.
  CPC .............. *G06F 9/5061* (2013.01); *G06F 9/54* (2013.01); *G01V 1/282* (2013.01); *G01V 1/284* (2013.01); *G01V 2210/70* (2013.01); *G06Q 10/0631* (2013.01)

(56) References Cited

U.S. PATENT DOCUMENTS

| | | | |
|---|---|---|---|
| 8,775,347 | B2 | 7/2014 | Goel et al. |
| 8,914,268 | B2 | 12/2014 | Dale et al. |
| 9,396,181 | B1 | 7/2016 | Sripada |
| 9,665,090 | B2 | 5/2017 | Loganathan |
| 10,268,453 | B1 | 4/2019 | Ong |
| 10,740,730 | B2 | 8/2020 | Altamirano et al. |
| 11,423,493 | B2 | 8/2022 | Fox et al. |
| 2002/0049575 | A1 | 4/2002 | Jalali |
| 2002/0062156 | A1 | 5/2002 | Yamakawa et al. |
| 2003/0208392 | A1 | 11/2003 | Shekar |
| 2004/0078778 | A1 | 4/2004 | Leymann et al. |
| 2004/0088115 | A1 | 5/2004 | Guggari et al. |
| 2005/0209836 | A1 | 9/2005 | Klumpen et al. |
| 2005/0209912 | A1 | 9/2005 | Veeningen et al. |
| 2007/0198223 | A1 | 8/2007 | Ella |
| 2008/0275594 | A1 | 11/2008 | de Guzman |
| 2008/0281525 | A1 | 11/2008 | Boone |
| 2008/0294387 | A1 | 11/2008 | Anderson |
| 2008/0306803 | A1 | 12/2008 | Vaal et al. |
| 2009/0132458 | A1 | 5/2009 | Edwards et al. |
| 2009/0152005 | A1 | 6/2009 | Chapman |
| 2009/0265110 | A1 | 10/2009 | Narayanan |
| 2010/0100409 | A1 | 4/2010 | Rahi |
| 2010/0299172 | A1 | 11/2010 | Nottoli |
| 2011/0155463 | A1 | 6/2011 | Khromov |
| 2011/0238458 | A1* | 9/2011 | Purcell .................. G06F 9/5072 709/204 |
| 2011/0251932 | A1 | 10/2011 | Early |
| 2012/0054246 | A1 | 3/2012 | Fischer |
| 2012/0096463 | A1 | 4/2012 | Agarwal |
| 2012/0166967 | A1 | 6/2012 | Deimbacher et al. |
| 2013/0231787 | A1 | 9/2013 | Chapman et al. |
| 2014/0007097 | A1 | 1/2014 | Chin et al. |
| 2014/0208253 | A1 | 7/2014 | Pettus et al. |
| 2014/0214469 | A1 | 7/2014 | Callow et al. |
| 2014/0237487 | A1 | 8/2014 | Prasanna |
| 2014/0246238 | A1 | 9/2014 | Abbassian et al. |
| 2015/0073715 | A1 | 3/2015 | Aarre |
| 2015/0193711 | A1 | 7/2015 | Lavrov |
| 2015/0278734 | A1 | 10/2015 | Grant |
| 2016/0026940 | A1 | 1/2016 | Johnson |
| 2016/0189318 | A1 | 6/2016 | Hein |
| 2016/0252897 | A1 | 9/2016 | Ashok |
| 2016/0253634 | A1 | 9/2016 | Thomeer et al. |
| 2016/0326846 | A1 | 11/2016 | Rashid |
| 2016/0356125 | A1 | 12/2016 | Bello |
| 2016/0358120 | A1 | 12/2016 | Moore |
| 2017/0152728 | A1 | 6/2017 | Abou-Sayed et al. |
| 2017/0249574 | A1* | 8/2017 | Knijnik ............ G06Q 10/06313 |
| 2017/0293994 | A1 | 10/2017 | Li et al. |
| 2017/0370191 | A1 | 12/2017 | Fox et al. |
| 2018/0012310 | A1 | 1/2018 | Fox et al. |
| 2018/0032928 | A1 | 2/2018 | Li |
| 2018/0075544 | A1 | 3/2018 | Passolt |
| 2018/0100392 | A1 | 4/2018 | Kleinguetl |
| 2018/0299849 | A1 | 10/2018 | Martin |
| 2019/0153701 | A1 | 5/2019 | Gates |
| 2019/0205484 | A1 | 7/2019 | Morkos |
| 2019/0213040 | A1* | 7/2019 | Oh .......................... G06F 9/526 |
| 2019/0226314 | A1 | 7/2019 | Dasys |
| 2019/0302310 | A1 | 10/2019 | Fox |
| 2019/0325534 | A1 | 10/2019 | Perry |
| 2019/0330968 | A1 | 10/2019 | Boone et al. |
| 2019/0333164 | A1 | 10/2019 | Fox |
| 2019/0354911 | A1 | 11/2019 | Alaniz et al. |
| 2020/0080412 | A1 | 3/2020 | Johnsen et al. |
| 2020/0081882 | A1 | 3/2020 | Cheriton |
| 2020/0174455 | A1 | 6/2020 | Fox et al. |
| 2020/0175443 | A1 | 6/2020 | Fox et al. |
| 2020/0175444 | A1 | 6/2020 | Fox et al. |
| 2020/0291764 | A1 | 9/2020 | Chahine |
| 2020/0410622 | A1 | 12/2020 | Bhat |
| 2021/0140294 | A1 | 5/2021 | Mollatt |

FOREIGN PATENT DOCUMENTS

| | | | | |
|---|---|---|---|---|
| WO | WO-2017079178 | A1 * | 5/2017 | ............ G01N 33/24 |
| WO | 2019209947 | A1 | 10/2019 | |
| WO | 2019222033 | A1 | 11/2019 | |

OTHER PUBLICATIONS

Anonymous: "Planning Domain Definition Language—Wikipedia", Mar. 26, 2018, pp. 1-8. Retrieved from the internet: URL:https://en.wikipedia.org/w/index.php?title=Planning_Domain_Definition_Language&oldid=832433831 retrieved on Dec. 14, 2021.
Fox, M., and Long, D. 2003. PDDL2.1: An extension to PDDL for expressing temporal planning domains. Journal of Artificial Intelligence Research 20 (2003) 61-124.
International Search Report and Written Opinion issued in the PCT Application PCT/US2019/031641, dated Jul. 17, 2019 (11 pages).
International Preliminary Report on Patentability issued in the PCT Application PCT/US2019/031641, dated Nov. 26, 2020 (8 pages).
Firby, Adaptive Execution in Complex Dynamic Worlds. Ph.D. Thesis, Yale University Department of Computer Science, 1989, 332 pages.
Simmons et al., "A Task Description Language for Robot Control", Proceedings of the Conference on Intelligent Robotics and Systems, Vancouver, Canada, Oct. 1998, pp. 1931-1937.
Gat, E., "Esl: A Language for Supporting Robust Plan Execution in Embedded Autonomous Agents", Proceedings of the AAAI Fall Symposium on Plan Execution, 1996, pp. 319-324.
Berry, G., The esterel v5 Language Primer, version 5.21 release 2.0, Centre de Mathematiques Appliquees, Ecole des Mines and INRIA, Apr. 6, 1999, 140 pgs.
Ingham et al., 2001: A Reactive Model-Based Programming Language for Robotic Space Explorers, Proceedings of ISAIRAS-01, 8 pages.
Berry et al., "The ESTEREL synchronous programming language: design, semantics, implementation", Science of Computer Programming, 19(2): 87-152, 1992.
Coles et al., "Forward-chaining partial-order planning", In Proceedings of the 20th International Conference on Automated Planning and Scheduling, ICAPS 2010, Toronto, Ontario, Canada, May 12-16, 2010, pp. 42-49, 2010.
Henzinger, "The Theory of Hybrid Automata", in Proceedings, 11th Annual IEEE Symposium on Logic in Computer Science, pp. 278-292, 1996.
Lamport, "Time, clocks, and the ordering of events in a distributed system", Communications of the ACM, 21(7):558-565, 1978.
Williams et al., "Model-based programming: Controlling embedded systems by reasoning about hidden state", in Principles and Practice of Constraint Programming—CP 2002, 8th International Conference, CP 2002, Ithaca, NY, USA, Sep. 9-13, 2002, Proceedings, pp. 508-524, 2002.
Apt et al., "Towards a theory of declarative knowledge", in Foundations of Deductive Databases and Logic Programming, pp. 89-148, 1988.

(56) References Cited

OTHER PUBLICATIONS

Bacchus et al., "Downward Refinement and the Efficiency of Hierarchical Problems-Solving", Artificial Intelligence, vol. 71, pp. 43-100, 1994.
Bernardini et al., "Leveraging Probabilistic Reasoning in Deterministic Planning for Large-Scale Autonomous Search-and-Tracking", in Proc. 26th International Conference on Automated Planning and Scheduling (ICAPS), pp. 47-55, 2016.
Bonasso et al., "Experiences with an Architecture for Intelligent Reactive Agent", Journal of Experimental and Theoretical Artificial Intelligence (JETAI), 9, 1997, 24 pages.
Coddington et al., "Madbot: A motivated and goal directed robot", in Proc. Of National conference on AI (AAAI), vol. 20, pp. 1680-1681, 2005.
Fox et al., "Exploration of the Robustness of Plans", in Proc. 21st National Conference on Artificial Intelligence (AAAI), pp. 834-839, 2006.
Gat, "On Three-Layer Architecutes", Artificial Intelligence and Mobile Robots, 195, 11 pages, 1998.
Gregory et la., "Planning Modulo Theories: Extending the Planning Paradigm", in Proc. 22nd International Conference on Automated Planning and Scheduling (ICAPS), 2012, 9 pages.
Hoffmann et al., "The FF Planning Systems: Fast Plan Generation Through Heuristic Search", J. Artif. Intell. Res. (JAIR), 14:253-302, 2001.
Howey et al., "VAL: automatic plan validation, continuous effects and mixed initiative planning using PDDL", in Proc. 16th IEEE International Conference on Tools with Artificial Intelligence (ICTAI), pp. 294-301, 2004.
Koymans et al., "Specifying Real-Time Properties with Metric Temporal Logic", Real-Time Systems, 2(4): 255-299, 1990.
McGann et la., "A Deliberative architecture for AUV Control", in Proc. IEEE International Conference on Robotics and Automation (ICRA), pp. 1049-1054, 2008.
Nieuwenhuis, "SAT modulo theories: Enhancing SAT with special-purpose algorithms", in Proc. 12th International Conference on Theory and Applications of Satisfiability Testing (SAT), p. 1, 2009.
Williams et al., "Model-based Programming of Intelligent Embedded Systems and Robotic Space Explorers", Proceedings of the IEEE, 91(1): 212-237, 2003.
Yoon et al., "FF-Replan: A Baseline for Probabilistic Planning", in Proc. 17th International Conference on Automated Planning and Scheduling (ICAPS), 2007, 8 pages.
Bajada, J. et al., "Load Modelling and Simulation of Household Electricity Consumption for the Evaluation of Demand-Side Management Strategies," 4th IEEE PES Innovative Smart Grid Technologies Europe, Oct. 6-9, 2013, Copenhagen, 5 pages.
Coles, A. et al., "Managing concurrency in temporal planning using planner-scheduler interaction", Artificial Intelligence 173, 2009, pp. 1-44.
Erol, K. et al., "UMCP: A Sound and Complete Procedure for Hierarchical Task-Network Planning", AIPS 1994 Proceedings, pp. 249-254.
Fox, M. et al., "Explainable Planning", IJCAI-17 Workshop on Explainable AI, Melbourne, Aug. 2017, 7 pages.
International Search Report and Written Opinion issued in International Patent Application No. PCT/US2019/031645, dated Aug. 20, 2019, 17 pages.
International Preliminary Report on Patentability issued in International Patent Application No. PCT/US2019/031645, dated Nov. 26, 2020, 12 pages.
Johnsen, S.O. O. et al., "Proactive Indicators To Control Risks in Operations of Oil and Gas Fields", SPE-126560, SPE Economics & Management, 2012, 4(2), pp. 90-105.
Awasthi, A. et al., "Closign the Gap Between Reservoir modeling and Production Optimization", SPE-107463, presented at the Digital Energy Conference and Exhibition, Houston, Texas, U.S.A., 2007.
"overlay", Apr. 8, 2015, Merriam Webster, 1 page.
Naghdy, Fazel, and Naeem Anjum, "Discrete-event modelling, simulation and control of a distributed manipulation environment", 1997, Robotica 15(2), pp. 181-198.
Xu, Yingzhuo, and Hangi Hu, "Research of cooperative system for drilling design based on Smart Client", 2010 IEEE International Conference on Intelligent Computing and Intelligent Systems, vol. 3, IEEE, 2010, pp. 329-333.
Balasubramanian, Sivaram, and Douglas H. Norrie, "A multiagent architecture for concurrent design, process planning, routing, and scheduling", 1996 Concurrent Engineering 4 (1), pp. 7-16.
Marier, A., A. El Mhamedi, and Z. Binder, "Analysis of a computer-aided teleoperation process by means of generalized stochastic Petri nets", 1997, Control Engineering Practice 5 (7), pp. 931-942.
Verfaillie, A timeline, event, and constraint-based modeling framework for planning and scheduling problems, Jun. 10, 2013, https://icaps13.icaps-conference.org/wp-content/uploads/2013/05/keps13-proceedings.pdf#page=62, p. 61-68.
David, R. M. et al., "Managing and Orchestrating Multi-Vendor Intelligent Oil Field Technology Environment to Enable Efficient Next Generation Production and Reservoir Management Workflows", SPE-176773-MS, presented at the SPE Middle East Intelligent Oil & Gas Conference & Exhibition held in Abu Dhabi, UAE, 2015, 7 pages.
"overlay", Merriam-Webster.com: https://www.merriam-webster.com, Mar. 7, 2023, 1 page.
"lock", Merriam-Webster.com: https://www.merriam-webster.com, Mar. 7, 2023, 4 pages.

* cited by examiner

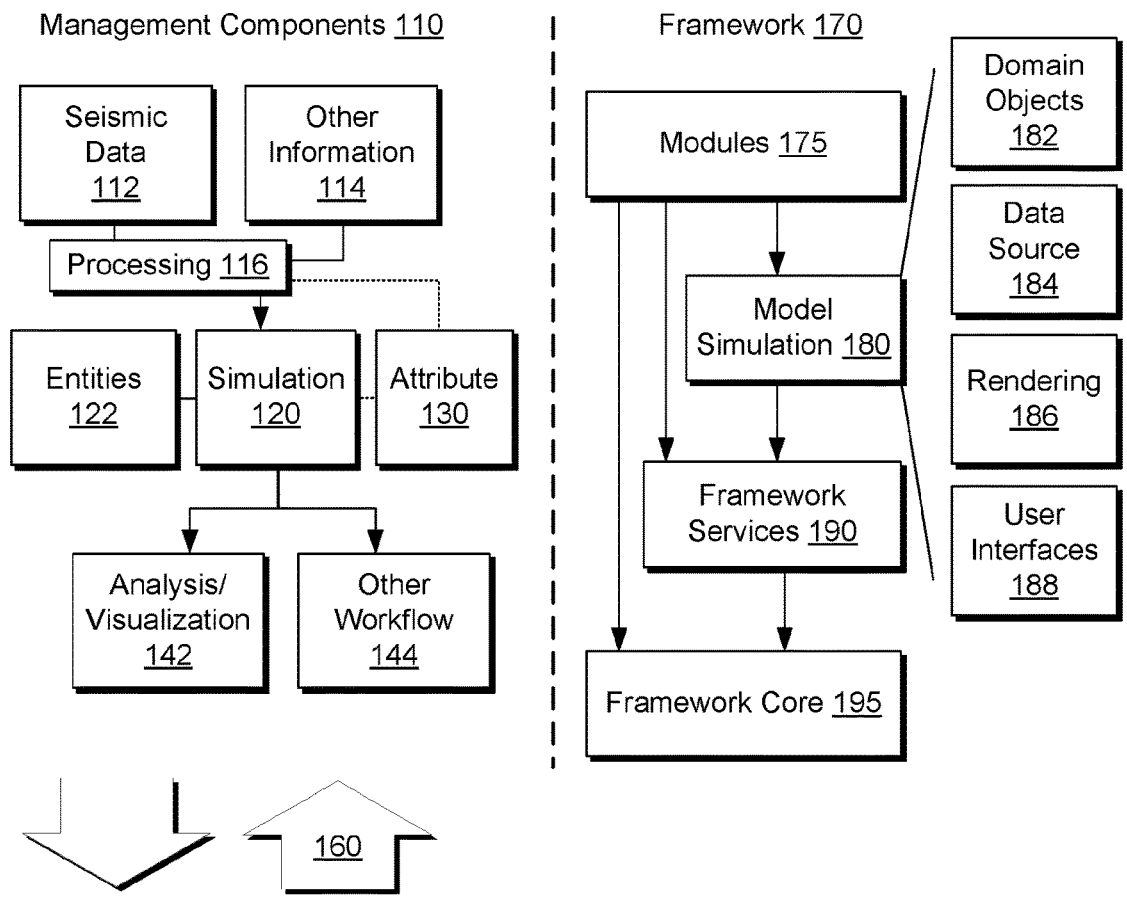
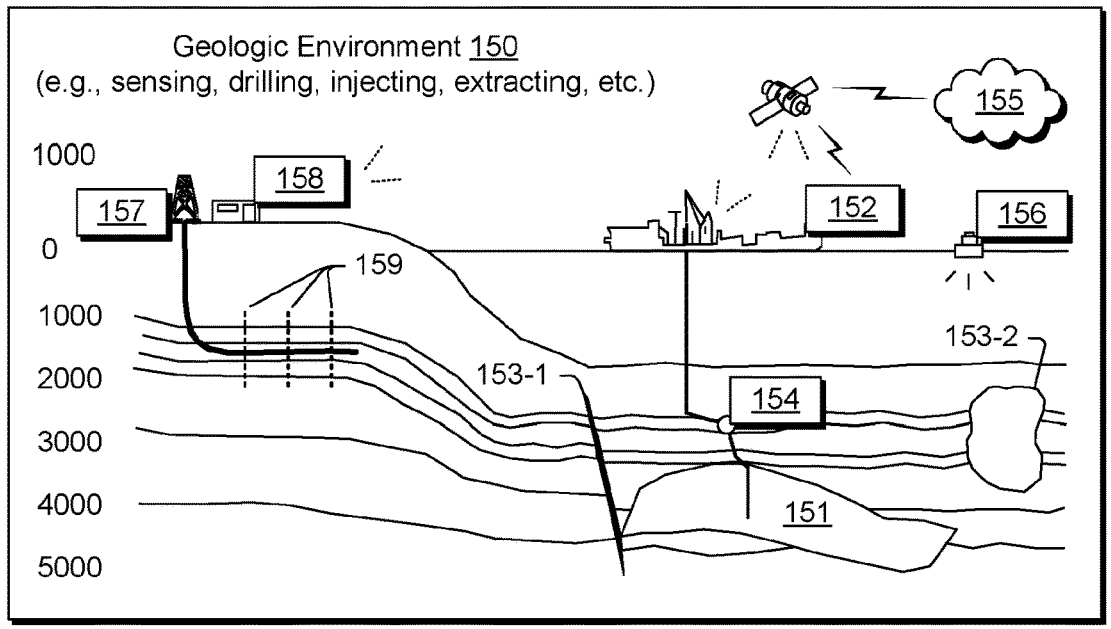
Fig. 1

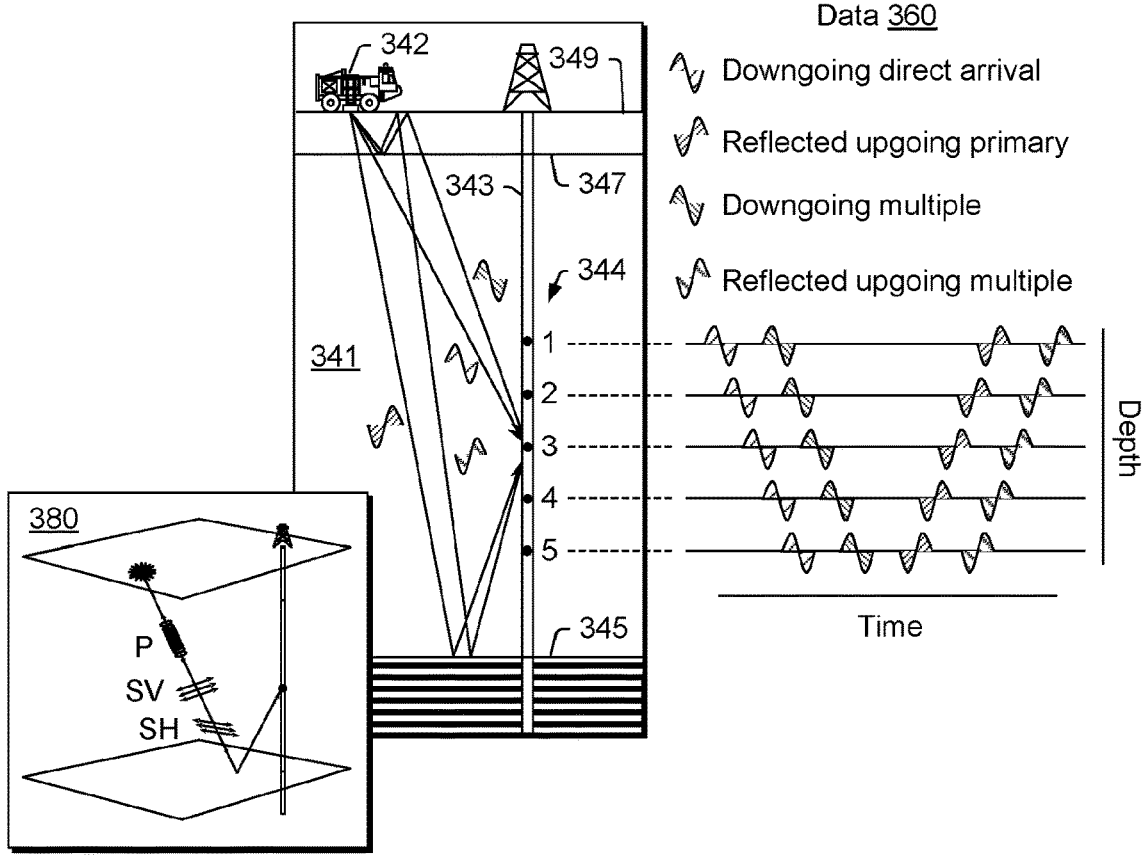
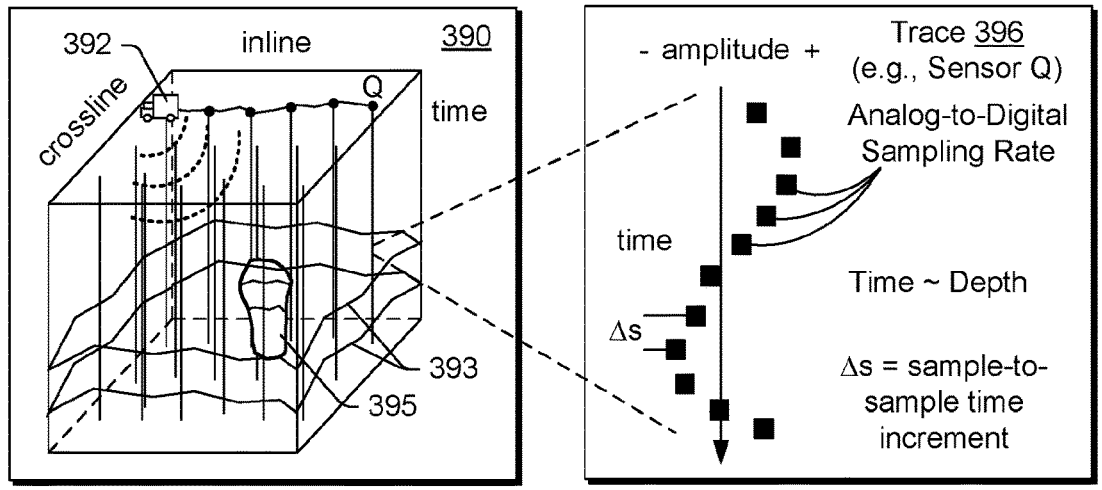
Fig. 3

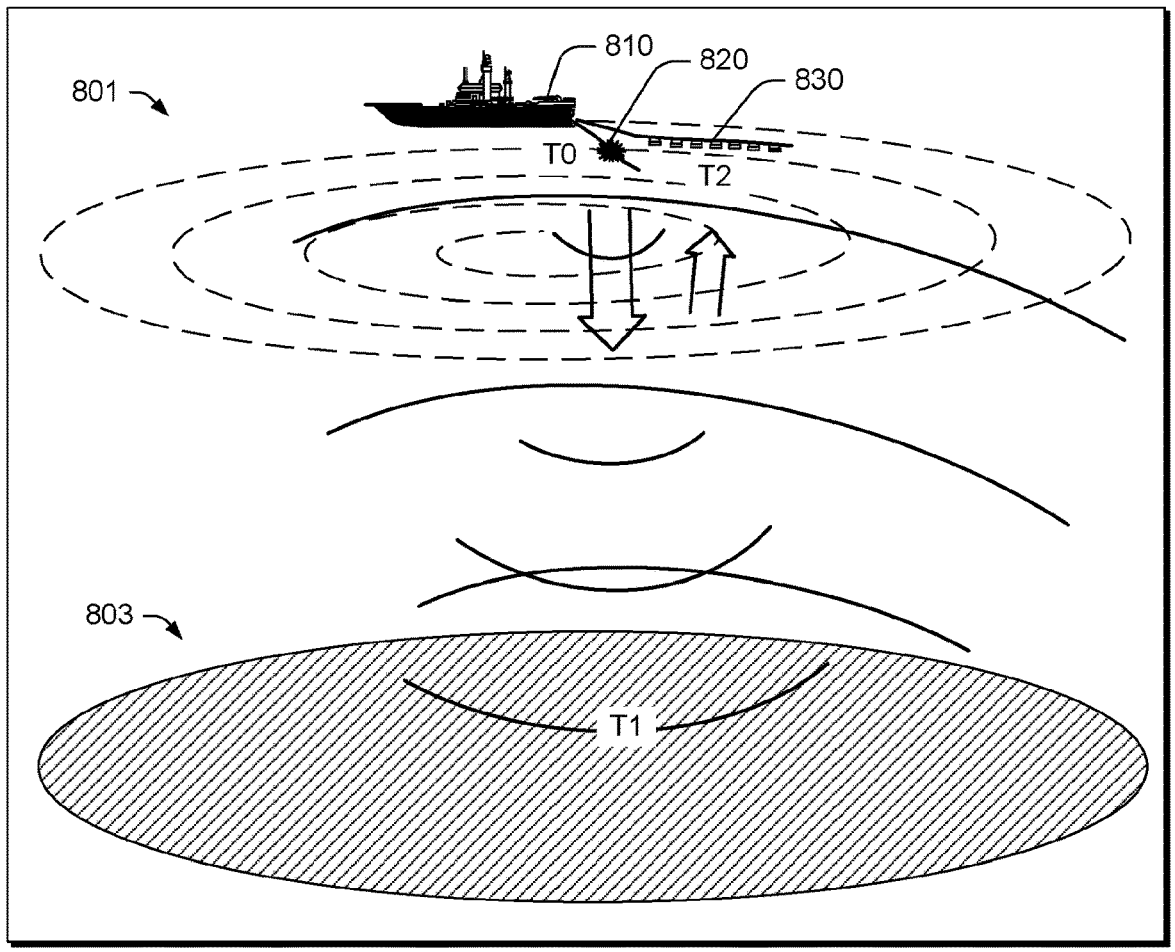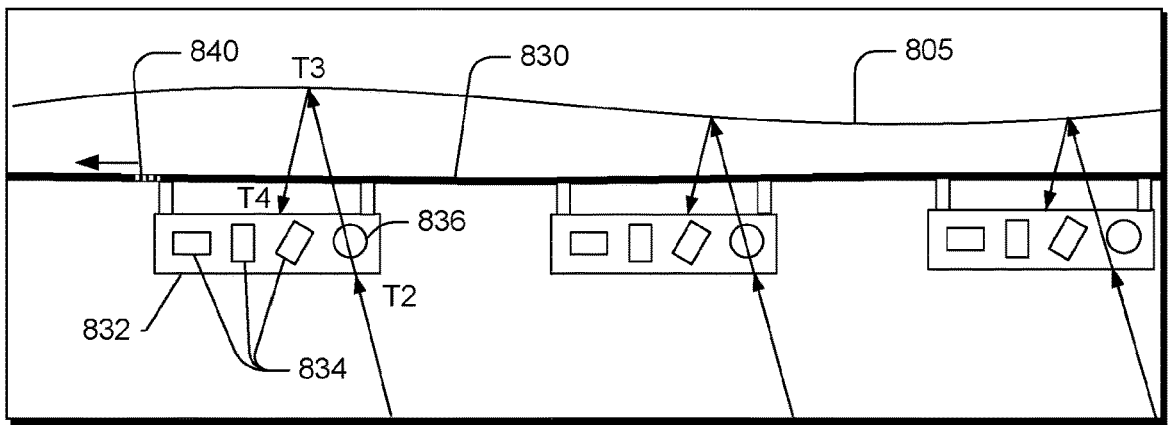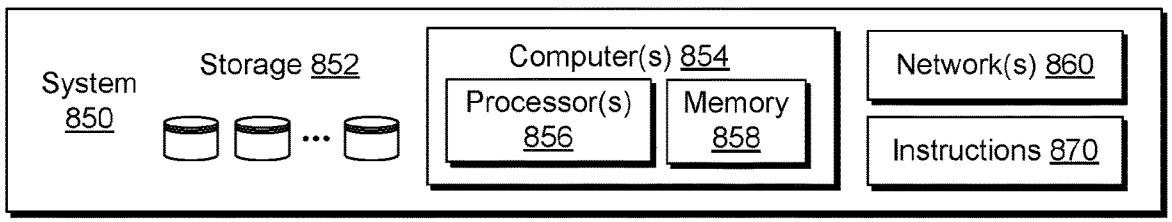
Fig. 8

Framework 1200
(e.g., Framework GUI(s))

| DOMAIN | PROBLEM | OPERATIONAL PLAN |
|---|---|---|
| (define(domain seismic)<br>(:requirements :strips : fluents : durative ....<br>(:types ....)<br><br>(:predicates ....)<br><br>(:functions ....)<br><br>;artifact action<br>(:action produce-consume .... )<br><br>; allocate a machine from available<br>(:action allocate-free .... )<br><br>; deallocate a machine back to pool<br>(:action deallocate-free .... )<br><br>;peform operation using pre-allocated<br>(:durative-action perform-free .... )<br><br>;allocate machine from discounted pool<br>(:action allocate-discounted ....<br><br>; deallocate a machine back to discounted<br>(:action deallocate-discounted .... )<br><br>;perform operation ....<br>(:durative-action perform operation .... ) | (define (problem seismic1) (:domain seismic)<br>(:requirements :strips : fluents : durative ....<br>(:objects ....)<br><br>(:init ....)<br><br>(:goal (and<br>(performed operation1)<br>(performed op2wGPU)<br>(performed operation3)<br>(performed operation 4)<br>...<br>(= (allocated) 0)<br>)<br>)<br>(:metric minimize (+(run-cost) (alloc ....)<br><br>... | Allocate-FP machine-8cpu-2gpu<br>Perform-FP machine-8cpu-2gpu<br>Deallocate-FP machine-8cpu-2gpu<br>Allocate-FP machine-8cpu-4gpu<br>Perform-FP machine-8cpu-4gpu<br>Deallocate-FP machine-8cpu-4gpu<br>Allocate-D machine-16cpu<br>Perform-D machine-16cpu<br>Deallocate-D machine-16cpu<br>Allocate-F machine-8cpu<br>Perform-F machine-8cpu<br>Deallocate-F machine-8cpu<br>...<br><br>Operation<br>Op1<br>Op2wGPU<br>Op3<br>Op4<br>...<br><br>Machine type<br>8cpu<br>16cpu<br>...<br>8cpu-1gpu<br>... |

| DOMAIN |
|---|
| (define(domain seismic)<br><br>(:requirements :strips : fluents : durative . . .<br><br>(:types . . . )<br><br>(:predicates . . . )<br><br>(:functions . . . )<br><br>;artifact action<br>(:action produce-consume . . . )<br><br>; allocate a machine from available<br>(:action allocate-free . . . )<br><br>; deallocate a machine back to pool<br>(:action deallocate-free . . . )<br><br>;peform operation using pre-allocated<br>(:durative-action perform-free . . .<br><br>;allocate machine from discounted pool<br>(:action allocate-discounted . . .<br><br>; deallocate a machine back to discounted<br>(:action deallocate-discounted . . . )<br><br>;perform operation . . .<br>(:durative-action perform operation . . . ) |

```
PROBLEM (define (problem seismic1) (:domain seismic)
    (:requirements :strips : fluents : durative . . .
        (:objects . . . )

(:init . . . )

(:goal (and . . .
                    (performed operation1)
                    (performed op2wGPU)
                    (performed operation3)
                    (performed operation 4)
                              ⋮
                    (= (allocated) 0)
            )
        )
        (:metric minimize (+(run-cost) (alloc . . .)
```

SEISMIC DATA INTERPRETATION SYSTEM

RELATED APPLICATIONS

This application claims the benefit of and priority to a US Provisional application having Ser. No. 62/670,737, filed 12 May 2018, which is incorporated by reference herein, and a US Provisional application having Ser. No. 62/670,803, filed 13 May 2018, which is incorporated by reference herein.

BACKGROUND

Interpretation is a process that involves analysis of data to identify and locate various subsurface structures (e.g., horizons, faults, geobodies, etc.) in a geologic environment. Various types of structures (e.g., stratigraphic formations) may be indicative of hydrocarbon traps or flow channels, as may be associated with one or more reservoirs (e.g., fluid reservoirs). In the field of resource extraction, enhancements to interpretation can allow for construction of a more accurate model of a subsurface region, which, in turn, may improve characterization of the subsurface region for purposes of resource extraction. Characterization of one or more subsurface regions in a geologic environment can guide, for example, performance of one or more operations (e.g., field operations, etc.).

SUMMARY

A method can include receiving a digital operational plan that specifies computational tasks for seismic workflows, that specifies computational resources and that specifies execution information; dispatching instructions that provision the computational resources for one of the computational tasks for one of the seismic workflows; issuing a request for the execution information; receiving the requested execution information during execution of the one of the computational tasks using the provisioned computational resources; and, based on the received execution information indicating that the execution of the one of the computational tasks deviates from the digital operational plan, dispatching at least one additional instruction that provisions at least one additional computational resource for the one of the computational tasks for the one of the seismic workflows. A system can include a processor; memory operatively coupled to the processor; and processor-executable instructions stored in the memory to instruct the system to: receive a digital operational plan that specifies computational tasks for seismic workflows, that specifies computational resources and that specifies execution information; dispatch instructions that provision the computational resources for one of the computational tasks for one of the seismic workflows; issue a request for the execution information; receive the requested execution information during execution of the one of the computational tasks using the provisioned computational resources; and, based on the received execution information indicating that the execution of the one of the computational tasks deviates from the digital operational plan, dispatch at least one additional instruction that provisions at least one additional computational resource for the one of the computational tasks for the one of the seismic workflows. One or more computer-readable storage media can include computer-executable instructions executable to instruct a computing system to: receive a digital operational plan that specifies computational tasks for seismic workflows, that specifies computational resources and that specifies execution information; dispatch instructions that provision the computational resources for one of the computational tasks for one of the seismic workflows; issue a request for the execution information; receive the requested execution information during execution of the one of the computational tasks using the provisioned computational resources; and, based on the received execution information indicating that the execution of the one of the computational tasks deviates from the digital operational plan, dispatch at least one additional instruction that provisions at least one additional computational resource for the one of the computational tasks for the one of the seismic workflows. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 1 illustrates an example system that includes various components for modeling a geologic environment and various equipment associated with the geologic environment;

FIG. 3 illustrates an example of a technique that may acquire data;

FIG. 8 illustrates an example of a marine seismic survey, an example of data acquisition and an example of a system;

FIG. 12 illustrates an example of a graphical user interface that includes examples expressed in PDDL for utilizing in a planning framework;

FIG. 13 illustrates a portion of the graphical user interface of FIG. 12;

FIG. 14 illustrates a portion of the graphical user interface of FIG. 12;

FIG. 19 illustrates an example of a graphical user interface;

DETAILED DESCRIPTION

Figure 2:
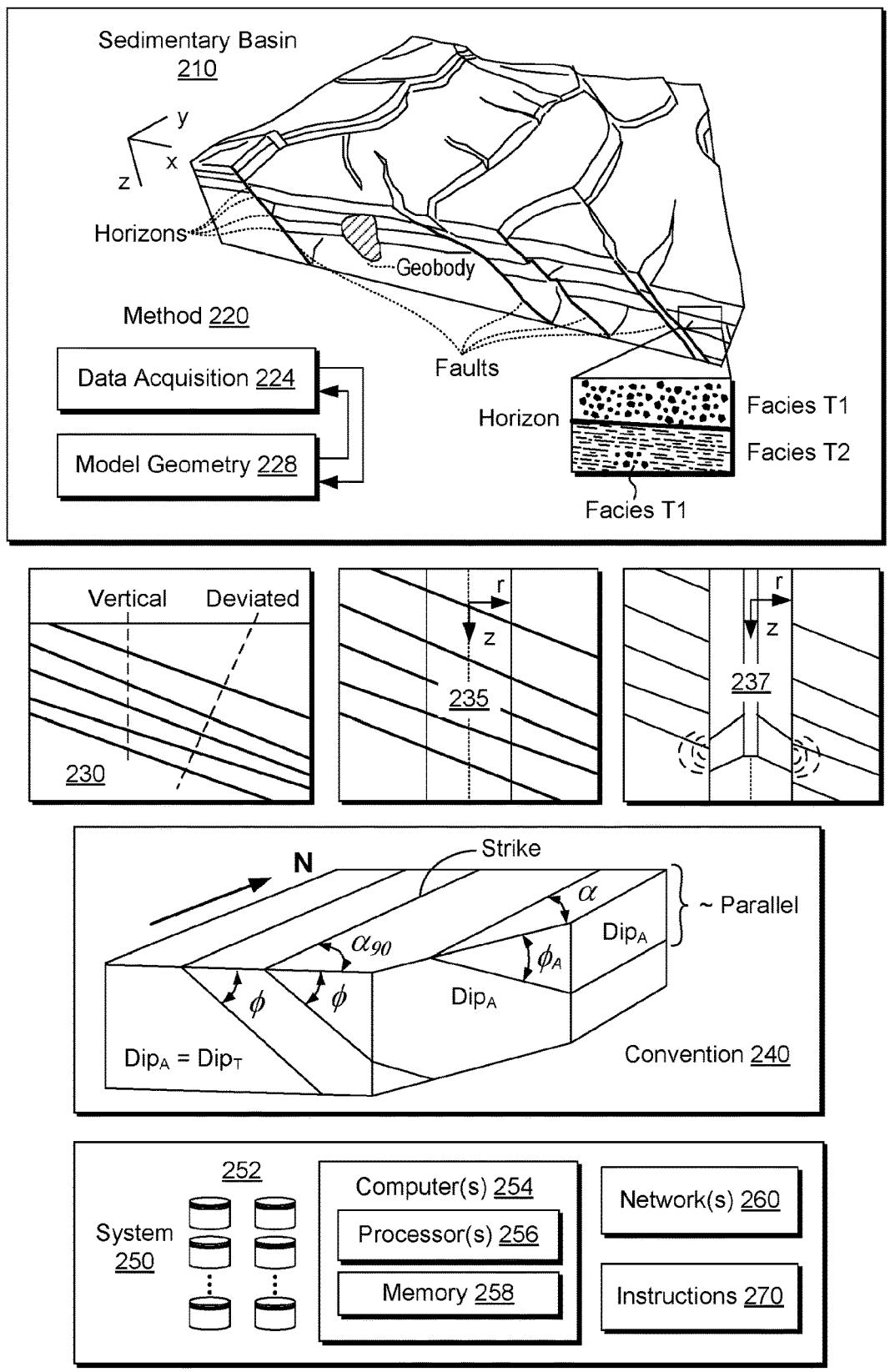
FIG. 2 illustrates an example of a sedimentary basin, an example of a method, an example of a formation, an example of a borehole, an example of a borehole tool, an example of a convention and an example of a system.

This description is not to be taken in a limiting sense, but rather is made merely for the purpose of describing the general principles of the implementations. The scope of the described implementations should be ascertained with reference to the issued claims.

FIG. 1 shows an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. An example of an object-based framework is the MICROSOFT .NET framework (Redmond, Wash.), which provides a set of extensible object classes. In the .NET framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE reservoir simulator (Schlumberger Limited, Houston Tex.), the INTERSECT reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a framework such as the PETREL seismic to simulation software framework (Schlumberger Limited, Houston, Tex.). The PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a framework environment marketed as the OCEAN framework environment (Schlumberger Limited, Houston, Tex.) allows for integration of add-ons (or plug-ins) into a PETREL framework workflow. The OCEAN framework environment leverages .NET tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

As an example, a framework may be implemented within or in a manner operatively coupled to the DELFI cognitive exploration and production (E&P) environment (Schlumberger Limited, Houston, Tex.), which is a secure, cognitive, cloud-based collaborative environment that integrates data and workflows with digital technologies, such as artificial intelligence and machine learning. As an example, such an environment can provide for operations that involve one or more computational frameworks. For example, various types of computational frameworks may be utilized within an environment such as a drilling plan framework, a seismic-to-simulation framework (e.g., PETREL framework, Schlumberger Limited, Houston, Tex.), a measurements framework (e.g., TECHLOG framework, Schlumberger Limited, Houston, Tex.), a mechanical earth modeling (MEM) framework (PETROMOD framework, Schlumberger Limited, Houston, Tex.), an exploration risk, resource, and value assessment framework (e.g., GEOX, Schlumberger Limited, Houston, Tex.), a reservoir simulation framework (INTERSECT, Schlumberger Limited, Houston, Tex.), a surface facilities framework (e.g., PIPESIM, Schlumberger Limited, Houston, Tex.), a stimulation framework (MANGROVE framework, Schlumberger Limited, Houston, Tex.). As an example, one or more methods may be implemented at least in part via a framework (e.g., a computational framework) and/or an environment (e.g., a computational environment).

FIG. 1 also shows an example of a framework 170 that includes a model simulation layer 180 along with a framework services layer 190, a framework core layer 195 and a modules layer 175. The framework 170 may include the OCEAN framework where the model simulation layer 180 is the PETREL model-centric software package that hosts OCEAN framework applications. In an example embodiment, the PETREL software may be considered a data-driven application. The PETREL software can include a framework for model building and visualization.

As an example, seismic data may be processed using a framework such as the OMEGA framework (Schlumberger Limited, Houston, Tex.). The OMEGA framework provides features that can be implemented for processing of seismic data, for example, through prestack seismic interpretation and seismic inversion. A framework may be scalable such that it enables processing and imaging on a single workstation, on a massive compute cluster, etc. As an example, one or more techniques, technologies, etc. described herein may optionally be implemented in conjunction with a framework such as, for example, the OMEGA framework.

A framework for processing data may include features for 2D line and 3D seismic surveys. Modules for processing seismic data may include features for prestack seismic interpretation (PSI), optionally pluggable into a framework such as the OCEAN framework. A workflow may be specified to include processing via one or more frameworks, plug-ins, add-ons, etc. A workflow may include quantitative interpretation, which may include performing pre- and post-stack seismic data conditioning, inversion (e.g., seismic to properties and properties to synthetic seismic), wedge modeling for thin-bed analysis, amplitude versus offset (AVO) and amplitude versus angle (AVA) analysis, reconnaissance, etc. As an example, a workflow may aim to output rock properties based at least in part on processing of seismic data. As an example, various types of data may be processed to provide one or more models (e.g., earth models). For example, consider processing of one or more of seismic data, well data, electromagnetic and magnetic telluric data, reservoir data, etc.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL software, for example, that operates on seismic data, seismic attribute(s), etc. As an example, a workflow may be a process implementable in the OCEAN framework. As an example, a workflow may include one or more worksteps that access a module such as a plug-in (e.g., external executable code, etc.).

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, reservoir simulation, petroleum systems modeling, etc. may be applied to characterize various types of subsurface environments, including environments such as those of FIG. 1. One or more operations may be performed in an environment based at least in part on such characterization of a subsurface environment or environments (e.g., via acquired data, simulation, modeling, etc.).

In FIG. 2, the sedimentary basin 210, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

A modeling framework marketed as the PETROMOD framework (Schlumberger Limited, Houston, Tex.) includes features for input of various types of information (e.g., seismic, well, geological, etc.) to model evolution of a sedimentary basin. The PETROMOD framework provides for petroleum systems modeling via input of various data such as seismic data, well data and other geological data, for example, to model evolution of a sedimentary basin. The PETROMOD framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL framework, workflows may be constructed to provide basin-to-prospect scale exploration solutions. Data exchange between frameworks can facilitate construction of models, analysis of data (e.g., PETROMOD framework data analyzed using PETREL framework capabilities), and coupling of workflows.

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230. As an example, a tool 237 may be positioned in a borehole, for example, to acquire information. As mentioned, a borehole tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, a borehole may be vertical, deviate and/or horizontal. As an example, a tool may be positioned to acquire information in a horizontal portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the TECHLOG framework (Schlumberger Limited, Houston, Tex.). The TECHLOG framework includes various features for handling, processing, etc., data that can include field data.

As to the convention 240 for dip, as shown, the three dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles φ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 240 of FIG. 2). Apparent dip may be the dip of a plane as measured in any other direction except in the direction of true dip (see, e.g., $\phi_A$ as $Dip_A$ for angle $\alpha$); however, it is possible that the apparent dip is equal to the true dip (see, e.g., $\phi$ as $Dip_A=Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with 0 as $Dip_A=Dip_T$ for angle $\alpha_{90}$ with respect to the strike). As indicated, dip observed in a cross-section in any other direction is apparent dip (see, e.g., surfaces labeled $Dip_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. (see, e.g., various blocks of the system 100 of FIG. 1). As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Data-based interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 2, the system 250 includes one or more information storage devices 252, one or more computers 254, one or more networks 260 and one or more sets of instructions 270. As to the one or more computers 254, each computer may include one or more processors (e.g., or processing cores) 256 and memory 258 for storing instructions (e.g., one or more of the one or more sets of instructions 270), for example, executable by at least one of the one or more processors 256. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252.

As an example, the one or more sets of instructions 270 may include instructions (e.g., stored in the memory 258) executable by one or more processors of the one or more processors 256 to instruct the system 250 to perform various actions. As an example, the system 250 may be configured such that the one or more sets of instructions 270 provide for establishing the framework 170 of FIG. 1 or a portion thereof. As an example, one or more methods, techniques, etc. may be performed using one or more sets of instructions, which may be, for example, one or more of the one or more sets of instructions 270 of FIG. 2.

As mentioned, seismic data may be acquired and analyzed to understand better subsurface structure of a geologic environment. Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less than about 1 Hz and/or optionally more than about 100 Hz). Seismic data may be processed and interpreted, for example, to understand better composition, fluid content, extent and geometry of subsurface rocks.

FIG. 3 shows an example of an acquisition technique 340 to acquire seismic data (see, e.g., data 360). As an example, a system may process data acquired by the technique 340, for example, to allow for direct or indirect management of sensing, drilling, injecting, extracting, etc., with respect to a geologic environment. In turn, further information about the geologic environment may become available as feedback (e.g., optionally as input to the system). As an example, an operation may pertain to a reservoir that exists in a geologic environment such as, for example, a reservoir. As an example, a technique may provide information (e.g., as an output) that may specifies one or more location coordinates of a feature in a geologic environment, one or more characteristics of a feature in a geologic environment, etc.

In FIG. 3, the technique 340 may be implemented with respect to a geologic environment 341. As shown, an energy source (e.g., a transmitter) 342 may emit energy where the energy travels as waves that interact with the geologic environment 341. As an example, the geologic environment 341 may include a bore 343 where one or more sensors (e.g., receivers) 344 may be positioned in the bore 343. As an example, energy emitted by the energy source 342 may interact with a layer (e.g., a structure, an interface, etc.) 345 in the geologic environment 341 such that a portion of the energy is reflected, which may then be sensed by one or more of the sensors 344. Such energy may be reflected as an upgoing primary wave (e.g., or "primary" or "singly" reflected wave). As an example, a portion of emitted energy may be reflected by more than one structure in the geologic environment and referred to as a multiple reflected wave (e.g., or "multiple"). For example, the geologic environment 341 is shown as including a layer 347 that resides below a surface layer 349. Given such an environment and arrangement of the source 342 and the one or more sensors 344, energy may be sensed as being associated with particular types of waves.

As an example, seismic data may include evidence of an interbed multiple from bed interfaces, evidence of a multiple from a water interface (e.g., an interface of a base of water and rock or sediment beneath it) or evidence of a multiple from an air-water interface, etc.

As shown in FIG. 3, the acquired data 360 can include data associated with downgoing direct arrival waves, reflected upgoing primary waves, downgoing multiple reflected waves and reflected upgoing multiple reflected waves. The acquired data 360 is also shown along a time axis and a depth axis. As indicated, in a manner dependent at least in part on characteristics of media in the geologic environment 341, waves travel at velocities over distances such that relationships may exist between time and space. Thus, time information, as associated with sensed energy, may allow for understanding spatial relations of layers, interfaces, structures, etc. in a geologic environment.

FIG. 3 also shows a diagram 380 that illustrates various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques. As an example of parameters that can characterize anisotropy of media (e.g., seismic anisotropy, etc.), consider the Thomsen parameters ε, δ and γ.

As an example, an inversion technique may be applied to generate a model that may include one or more parameters such as one or more of the Thomsen parameters. For example, one or more types of data may be received and used in solving an inverse problem that outputs a model (e.g., a reflectivity model, an impedance model, a fluid flow model, etc.).

In the example of FIG. 3, a diagram 390 shows acquisition equipment 392 emitting energy from a source (e.g., a transmitter) and receiving reflected energy via one or more sensors (e.g., receivers) strung along an inline direction. As the region includes layers 393 and, for example, the geobody 395, energy emitted by a transmitter of the acquisition equipment 392 can reflect off the layers 393 and the geobody 395. Evidence of such reflections may be found in the acquired traces. As to the portion of a trace 396, energy received may be discretized by an analog-to-digital converter that operates at a sampling rate. For example, the acquisition equipment 392 may convert energy signals sensed by sensor Q to digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

A 4D seismic survey involves acquisition of 3D seismic data at different times over a particular area. Such an approach can allow for assessing changes in a producing hydrocarbon reservoir with respect to time. As an example, changes may be observed in one or more of fluid location and saturation, pressure and temperature. 4D seismic data can be considered to be a form of time-lapse seismic data.

As an example, a seismic survey and/or other data acquisition may be for onshore and/or offshore geologic environments. As to offshore, streamers, seabed cables, nodes and/or other equipment may be utilized. As an example, nodes can be utilized as an alternative and/or in addition to seabed cables, which have been installed in several fields to acquire 4D seismic data. Nodes can be deployed to acquire seismic data (e.g., 4D seismic data) and can be retrievable after acquisition of the seismic data. As an example, a 4D seismic survey may call for one or more processes aimed at repeatability of data. A 4D survey can include two phases: a baseline survey phase and a monitor survey phase.

As an example, seismic data may be processed in a technique called "depth imaging" to form an image (e.g., a depth image) of reflection amplitudes in a depth domain for a particular target structure (e.g., a geologic subsurface region of interest).

As an example, seismic data may be processed to obtain an elastic model pertaining to elastic properties of a geologic subsurface region. For example, consider elastic properties such as density, compressional (P) impedance, compression velocity ($v_p$)-to-shear velocity ($v_s$) ratio, anisotropy, etc. As an example, an elastic model can provide various insights as to a surveyed region's lithology, reservoir quality, fluids, etc.

Figure 4:
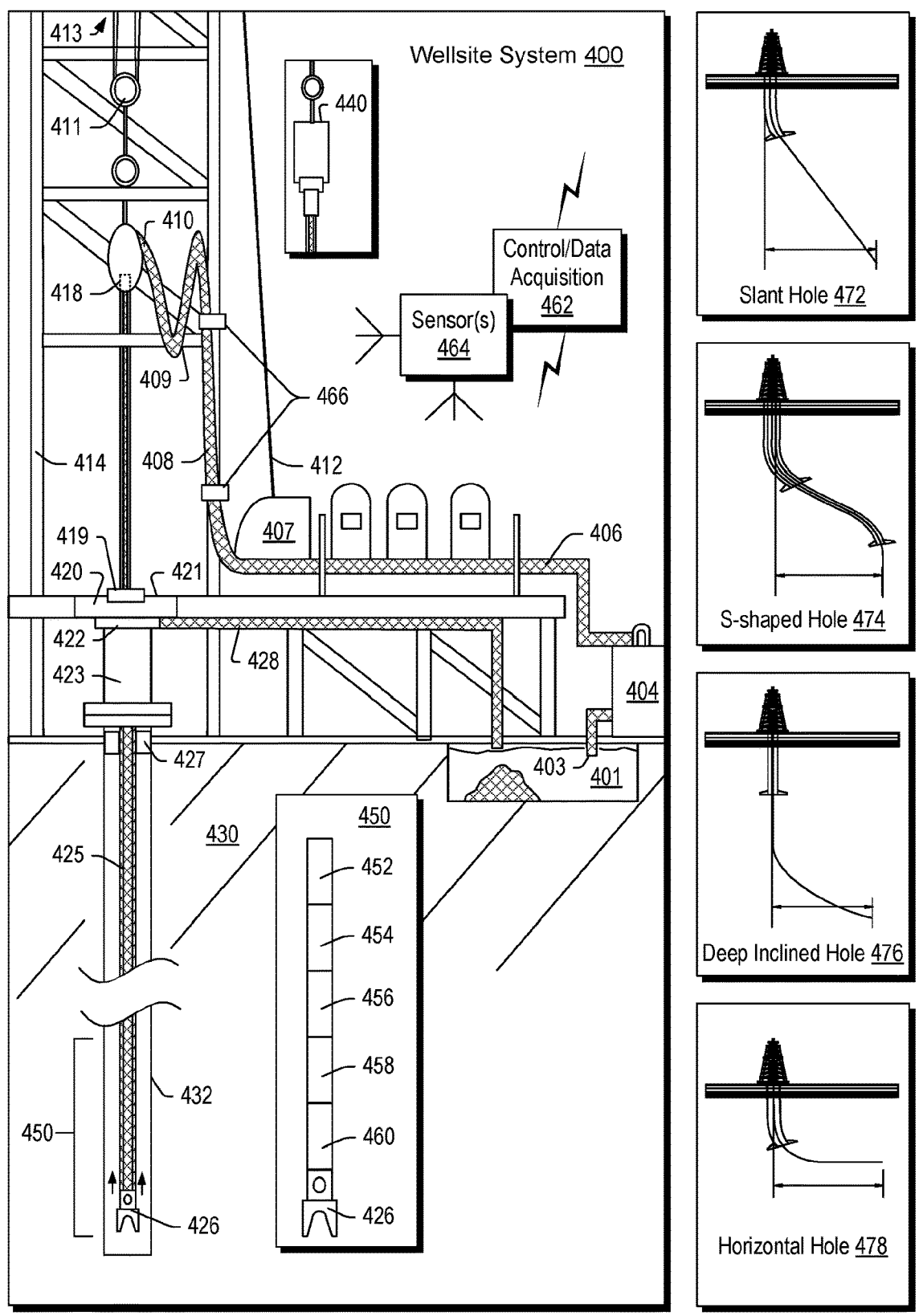
FIG. 4 illustrates examples of equipment including examples of downhole tools and examples of bores.

FIG. 4 shows an example of a wellsite system 400 (e.g., at a wellsite that may be onshore or offshore). As shown, the wellsite system 400 can include a mud tank 401 for holding mud and other material (e.g., where mud can be a drilling fluid), a suction line 403 that serves as an inlet to a mud pump 404 for pumping mud from the mud tank 401 such that mud flows to a vibrating hose 406, a drawworks 407 for winching drill line or drill lines 412, a standpipe 408 that receives mud from the vibrating hose 406, a kelly hose 409 that receives mud from the standpipe 408, a gooseneck or goosenecks 410, a traveling block 411, a crown block 413 for carrying the traveling block 411 via the drill line or drill lines 412, a derrick 414, a kelly 418 or a top drive 440, a kelly drive bushing 419, a rotary table 420, a drill floor 421, a bell nipple 422, one or more blowout preventors (BOPs) 423, a drillstring 425, a drill bit 426, a casing head 427 and a flow pipe 428 that carries mud and other material to, for example, the mud tank 401.

In the example system of FIG. 4, a borehole 432 is formed in subsurface formations 430 by rotary drilling; noting that various example embodiments may also use directional drilling.

As shown in the example of FIG. 4, the drillstring 425 is suspended within the borehole 432 and has a drillstring assembly 450 that includes the drill bit 426 at its lower end. As an example, the drillstring assembly 450 may be a bottom hole assembly (BHA).

The wellsite system 400 can provide for operation of the drillstring 425 and other operations. As shown, the wellsite system 400 includes the platform 411 and the derrick 414 positioned over the borehole 432. As mentioned, the wellsite system 400 can include the rotary table 420 where the drillstring 425 pass through an opening in the rotary table 420.

As shown in the example of FIG. 4, the wellsite system 400 can include the kelly 418 and associated components, etc., or a top drive 440 and associated components. As to a kelly example, the kelly 418 may be a square or hexagonal metal/alloy bar with a hole drilled therein that serves as a mud flow path. The kelly 418 can be used to transmit rotary motion from the rotary table 420 via the kelly drive bushing 419 to the drillstring 425, while allowing the drillstring 425 to be lowered or raised during rotation. The kelly 418 can pass through the kelly drive bushing 419, which can be driven by the rotary table 420. As an example, the rotary table 420 can include a master bushing that operatively couples to the kelly drive bushing 419 such that rotation of the rotary table 420 can turn the kelly drive bushing 419 and hence the kelly 418. The kelly drive bushing 419 can include an inside profile matching an outside profile (e.g., square, hexagonal, etc.) of the kelly 418; however, with slightly larger dimensions so that the kelly 418 can freely move up and down inside the kelly drive bushing 419.

As to a top drive example, the top drive 440 can provide functions performed by a kelly and a rotary table. The top drive 440 can turn the drillstring 425. As an example, the top drive 440 can include one or more motors (e.g., electric and/or hydraulic) connected with appropriate gearing to a short section of pipe called a quill, that in turn may be screwed into a saver sub or the drillstring 425 itself. The top drive 440 can be suspended from the traveling block 411, so the rotary mechanism is free to travel up and down the derrick 414. As an example, a top drive 440 may allow for drilling to be performed with more joint stands than a kelly/rotary table approach.

In the example of FIG. 4, the mud tank 401 can hold mud, which can be one or more types of drilling fluids. As an example, a wellbore may be drilled to produce fluid, inject fluid or both (e.g., hydrocarbons, minerals, water, etc.).

In the example of FIG. 4, the drillstring 425 (e.g., including one or more downhole tools) may be composed of a series of pipes threadably connected together to form a long tube with the drill bit 426 at the lower end thereof. As the drillstring 425 is advanced into a wellbore for drilling, at some point in time prior to or coincident with drilling, the mud may be pumped by the pump 404 from the mud tank 401 (e.g., or other source) via a the lines 406, 408 and 409 to a port of the kelly 418 or, for example, to a port of the top drive 440. The mud can then flow via a passage (e.g., or passages) in the drillstring 425 and out of ports located on the drill bit 426 (see, e.g., a directional arrow). As the mud exits the drillstring 425 via ports in the drill bit 426, it can then circulate upwardly through an annular region between an outer surface(s) of the drillstring 425 and surrounding wall(s) (e.g., open borehole, casing, etc.), as indicated by directional arrows. In such a manner, the mud lubricates the drill bit 426 and carries heat energy (e.g., frictional or other energy) and formation cuttings to the surface where the mud (e.g., and cuttings) may be returned to the mud tank 401, for example, for recirculation (e.g., with processing to remove cuttings, etc.).

The mud pumped by the pump 404 into the drillstring 425 may, after exiting the drillstring 425, form a mudcake that lines the wellbore which, among other functions, may reduce friction between the drillstring 425 and surrounding wall(s) (e.g., borehole, casing, etc.). A reduction in friction may facilitate advancing or retracting the drillstring 425. During a drilling operation, the entire drill string 425 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 426 of the drill string 425 at a bottom of a wellbore, pumping of the mud commences to lubricate the drill bit 426 for purposes of drilling to enlarge the wellbore. As mentioned, the mud can be pumped by the pump 404 into a passage of the drillstring 425 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 425) may be transmitted uphole to an uphole device, which may relay such information to other equipment for processing, control, etc.

As an example, telemetry equipment may operate via transmission of energy via the drillstring 425 itself. For example, consider a signal generator that imparts coded energy signals to the drillstring 425 and repeaters that may receive such energy and repeat it to further transmit the coded energy signals (e.g., information, etc.).

As an example, the drillstring 425 may be fitted with telemetry equipment 452 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 4, an uphole control and/or data acquisition system 462 may include circuitry to sense pressure pulses generated by telemetry equipment 452 and, for example, communicate sensed pressure pulses or information derived therefrom for process, control, etc.

The assembly 450 of the illustrated example includes a logging-while-drilling (LWD) module 454, a measuring-while-drilling (MWD) module 456, an optional module 458, a roto-steerable system and motor 460, and the drill bit 426.

The LWD module 454 may be housed in a suitable type of drill collar and can contain one or a plurality of selected types of logging tools. It will also be understood that more than one LWD and/or MWD module can be employed, for example, as represented at by the module 456 of the drillstring assembly 450. Where the position of an LWD module is mentioned, as an example, it may refer to a module at the position of the LWD module 454, the module 456, etc. An LWD module can include capabilities for measuring, processing, and storing information, as well as for communicating with the surface equipment. In the illustrated example, the LWD module 454 may include a seismic measuring device.

The MWD module 456 may be housed in a suitable type of drill collar and can contain one or more devices for measuring characteristics of the drillstring 425 and the drill bit 426. As an example, the MWD tool 454 may include equipment for generating electrical power, for example, to power various components of the drillstring 425. As an example, the MWD tool 454 may include the telemetry equipment 452, for example, where the turbine impeller can generate power by flow of the mud; it being understood that other power and/or battery systems may be employed for purposes of powering various components. As an example, the MWD module 456 may include one or more of the following types of measuring devices: a weight-on-bit measuring device, a torque measuring device, a vibration measuring device, a shock measuring device, a stick slip measuring device, a direction measuring device, and an inclination measuring device.

FIG. 4 also shows some examples of types of holes that may be drilled. For example, consider a slant hole 472, an S-shaped hole 474, a deep inclined hole 476 and a horizontal hole 478.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 4, the wellsite system 400 can include one or more sensors 464 that are operatively coupled to the control and/or data acquisition system 462. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 400. As an example, a sensor or sensor may be at an offset wellsite where the wellsite system 400 and the offset wellsite are in a common field (e.g., oil and/or gas field).

As an example, one or more of the sensors 464 can be provided for tracking pipe, tracking movement of at least a portion of a drillstring, etc.

As an example, the system 400 can include one or more sensors 466 that can sense and/or transmit signals to a fluid conduit such as a drilling fluid conduit (e.g., a drilling mud conduit). For example, in the system 400, the one or more sensors 466 can be operatively coupled to portions of the standpipe 408 through which mud flows. As an example, a downhole tool can generate pulses that can travel through the mud and be sensed by one or more of the one or more sensors 466. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 400 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", the can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 5:
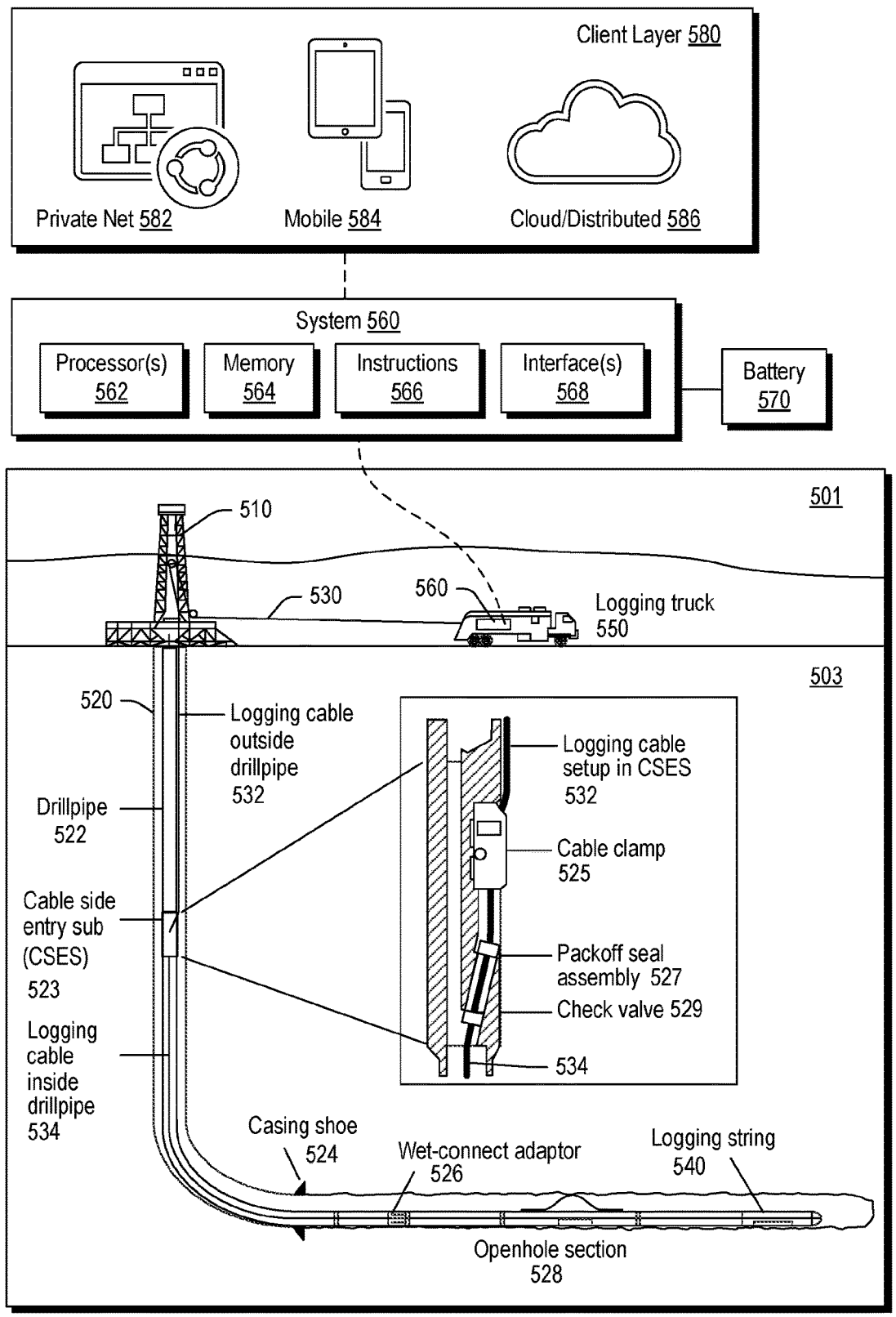
FIG. 5 illustrates examples of equipment including examples of downhole tools.

FIG. 5 shows an example of an environment 501 that includes a subterranean portion 503 where a rig 510 is positioned at a surface location above a bore 520. In the example of FIG. 5, various wirelines services equipment can be operated to perform one or more wirelines services including, for example, acquisition of data from one or more positions within the bore 520.

In the example of FIG. 5, the bore 520 includes drillpipe 522, a casing shoe 524, a cable side entry sub (CSES) 523, a wet-connector adaptor 526 and an openhole section 528. As an example, the bore 520 can be a vertical bore or a deviated bore where one or more portions of the bore may be vertical and one or more portions of the bore may be deviated, including substantially horizontal.

In the example of FIG. 5, the CSES 523 includes a cable clamp 525, a packoff seal assembly 527 and a check valve 529. These components can provide for insertion of a logging cable 530 that includes a portion 532 that runs outside the drillpipe 522 to be inserted into the drillpipe 522 such that at least a portion 534 of the logging cable runs inside the drillpipe 522. In the example of FIG. 5, the logging cable 530 runs past the wet-connect adaptor 526 and into the openhole section 528 to a logging string 540.

As shown in the example of FIG. 5, a logging truck 550 (e.g., a wirelines services vehicle) can deploy the wireline 530 under control of a system 560. As shown in the example of FIG. 5, the system 560 can include one or more processors 562, memory 564 operatively coupled to at least one of the one or more processors 562, instructions 566 that can be, for example, stored in the memory 564, and one or more interfaces 568. As an example, the system 560 can include one or more processor-readable media that include processor-executable instructions executable by at least one of the one or more processors 562 to cause the system 560 to control one or more aspects of equipment of the logging string 540 and/or the logging truck 550. In such an example, the memory 564 can be or include the one or more processor-readable media where the processor-executable instructions can be or include instructions. As an example, a processor-readable medium can be a computer-readable storage medium that is not a signal and that is not a carrier wave.

FIG. 5 also shows a battery 570 that may be operatively coupled to the system 560, for example, to power the system 560. As an example, the battery 570 may be a back-up battery that operates when another power supply is unavailable for powering the system 560 (e.g., via a generator of the wirelines truck 550, a separate generator, a power line, etc.). As an example, the battery 570 may be operatively coupled to a network, which may be a cloud network. As an example, the battery 570 can include smart battery circuitry and may be operatively coupled to one or more pieces of equipment via a SMBus or other type of bus.

As an example, the system 560 can be operatively coupled to a client layer 580. In the example of FIG. 5, the client layer 580 can include features that allow for access and interactions via one or more private networks 582, one or more mobile platforms and/or mobile networks 584 and via the "cloud" 586, which may be considered to include distributed equipment that forms a network such as a network of networks. As an example, the system 560 can include circuitry to establish a plurality of connections (e.g., sessions). As an example, connections may be via one or more types of networks. As an example, connections may be client-server types of connections where the system 560 operates as a server in a client-server architecture. For example, clients may log-in to the system 560 where multiple clients may be handled, optionally simultaneously.

As an example, a seismic workflow may provide for processing of microseismic data as a type of seismic data. Microseismic monitoring (e.g., a type of seismic survey) provides a valuable tool to evaluate hydraulic fracture treatments in real-time and can be utilized in planning and managing reservoir development. Microseismic event locations, source characteristics and attributes provide can provide estimates of hydraulic fracturing geometry that can be evaluated with respect to a completion plan and expected fracture growth. Microseismic event derived attributes such as fracture azimuth, height and length, location and complexity, may be utilized to determine the extent of fracture coverage of the reservoir target and effective stimulated volume, as well as in diagnosing under-stimulated sections of the reservoir and in planning re-stimulation of under-producing perforations and wells. Microseismic event locations can also help to avoid hazards during stimulation (e.g. faults, karst, aquifers, etc.). As an example, a method can include modifications to one or more treatment plans and operations based at least in part on microseismic interpretations as part of a seismic interpretation workflow.

As an example, microseismic monitoring results may be used in updating and calibrating geologic and structural models used in planning completions. Information about the inelastic deformation of the fracture source (fracture plane orientation and slip) that generates the microseismic signal may be, for example, obtained through moment tensor inversion. The moment tensor can describe various source types (e.g. explosion, tensile crack opening or closing, slip on a plane or combination thereof). As hydraulic fracture microseismicity is the result of high-pressure injection of fluids and proppant to open fracture paths, moment tensor inversion can be used to determine fracture opening and closing events from shear displacements, providing valuable information to engineers as to whether their fractures pathways are open or closed. Moment tensors may also provide a direct measurement of the local stress-strain regime, fracture orientations, and changes to the local stresses and fracture orientation through time that can be used to develop and calibrate discrete fracture network (DFN) models, which may be part of structural models of a geologic environment.

As an example, sensed microseismic energy may be analyzed as part of a seismic interpretation workflow, for example, to determine one or more of distance and azimuth from a sensor to a source of an elastic wave emission and depth of a source of an elastic wave emission (e.g., to determine location information, etc.). In a fracturing operation, a source of an elastic wave emission may be registered as an event, which can include a time, a location and one or more acquired signals (e.g., traces). As an example, information associated with an event may be analyzed to determine one or more of location and magnitude.

As an example, distance (d) to an event may be derived by measuring a time difference (ΔT) between arrival times for a P-wave (TP) and an S-wave (TS). The value of the distance d may depend on use of a velocity model that characterizes velocity of elastic wave energy (e.g., elastic waves) with respect to depth. A velocity model may describe P-wave velocity and S-wave velocity with respect to depth (e.g., variation in material, pressures, etc. of a geologic environment).

As an example, azimuth to a microseismic event may be determined by analyzing particle motion of P-waves, for example, using hodograms, where a hodogram can be a plot of sensed energy along at least two geophone axes as a function of time. A hodogram may be a graph or curve that displays time versus distance of motion. For example, a hodogram may be a crossplot of two components of particle motion over a time window. Hodograms may be part of a borehole seismologic survey where they may be used to determine arrival directions of waves and to detect shear-wave splitting.

As to determination of depth of a microseismic event, P-wave and S-wave arrival delays between sensors, or moveout, at a monitoring bore may be analyzed.

Microseismicity recorded during multistage fracture treatments may provide disperse "clouds" of events (e.g., located at individual event hypocenters). As an example, a method can include analyzing clouds of events to extract planar-type features, which may be indicative of fracture location, directions of stresses, etc. Such information may be utilized, for example, in generating a discrete fracture network (DFN) and/or for one or more other purposes.

Integrated workflows leveraging multi-scale, multi-domain measurements and microseismic interpretation can allow for optimization of hydraulic fracturing treatment for increased production. Such integrated completions planning workflows may use a wide variety of information about the geology (e.g., lithology, stress contrast, natural fracturing, structural or depositional dip, faulting), and the associated rock properties, (e.g., noise, slowness, anisotropy, attenuation) to improve hydraulic fracturing operations to lead to improved hydraulic fracture stimulations, completion plans, and well placement and, thereby, improved production. As an example, microseismic event locations and attributes may be integrated and compared with treatment pressure records, proppant concentration, and injection rate to better perform field operations.

FIGS. 1, 2, 3, 4 and 5 show various examples of equipment in various examples of environments. As an example, one or more workflows may be implemented to perform operations using equipment in one or more environments. As an example, a workflow may aim to understand an environment. As an example, a workflow may aim to drill into an environment, for example, to form a bore defined by surrounding earth (e.g., rock, fluids, etc.). As an example, a workflow may aim to acquire data from a downhole tool disposed in a bore where such data may be acquired via a drilling tool (e.g., as part of a bottom hole assembly) and/or a wireline tool. As an example, a workflow may aim to support a bore, for example, via casing. As an example, a workflow may aim to fracture an environment, for example, via injection of fluid. As an example, a workflow may aim to produce fluids from an environment via a bore. As an example, a workflow may utilize one or more frameworks that operate at least in part via a computer (e.g., a computing device, a computing system, etc.).

Figure 6:
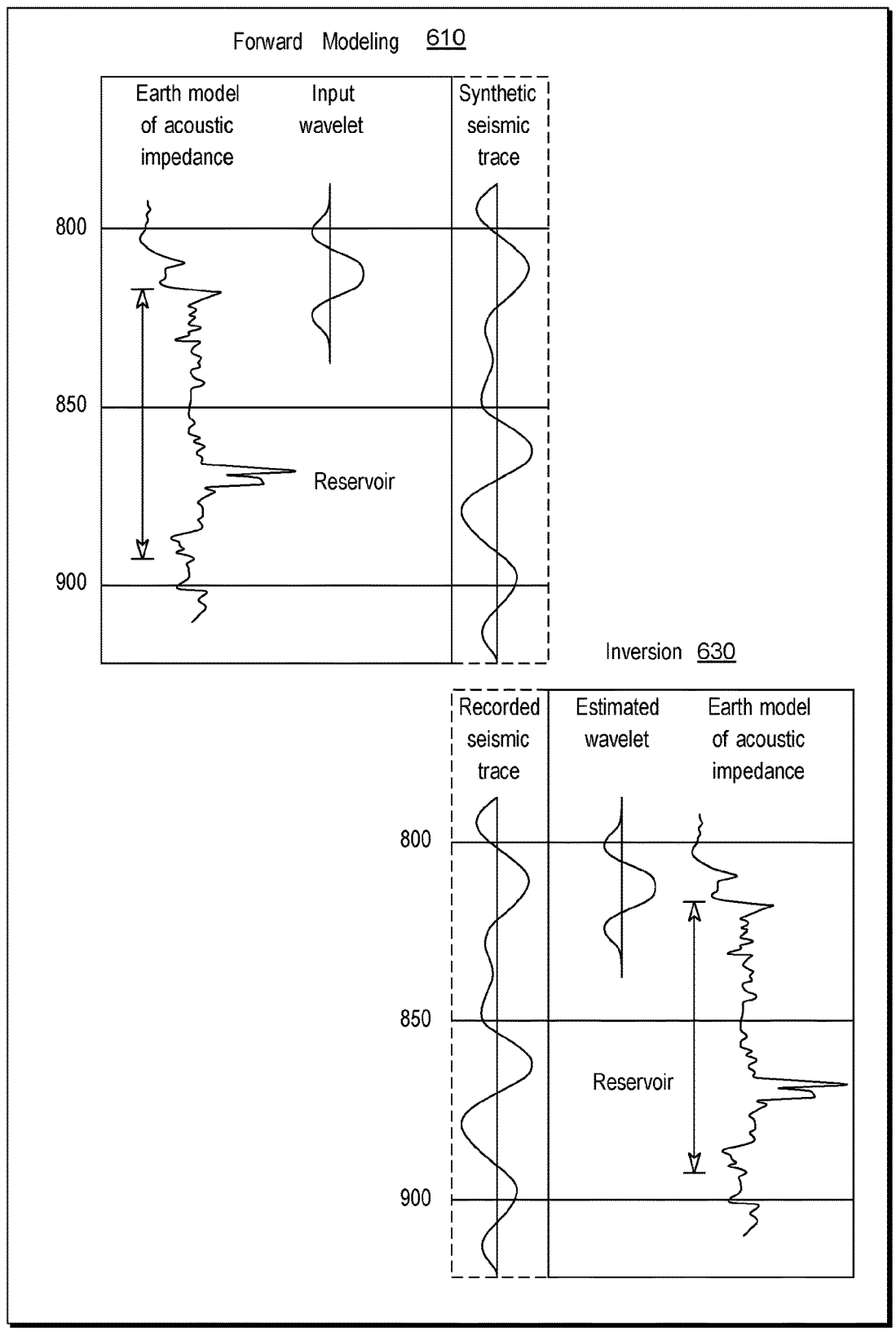
FIG. 6 illustrates an example of forward modeling and inversion as to seismic data and an Earth model of acoustic impedance.

FIG. 6 shows an example of forward modeling 610 and an example of inversion 630 (e.g., an inversion or inverting). As shown, the forward modeling 610 progresses from an earth model of acoustic impedance and an input wavelet to a synthetic seismic trace while the inversion 630 progresses from a recorded seismic trace to an estimated wavelet and an earth model of acoustic impedance. As an example, forward modeling can take a model of formation properties (e.g., acoustic impedance as may be available from well logs) and combine such information with a seismic wavelength (e.g., a pulse) to output one or more synthetic seismic traces while inversion can commence with a recorded seismic trace, account for effect(s) of an estimated wavelet (e.g., a pulse) to generate values of acoustic impedance for a series of points in time (e.g., depth).

As an example, a method may employ amplitude inversion. For example, an amplitude inversion method may receive arrival times and amplitude of reflected seismic waves at a plurality of reflection points to solve for relative impedances of a formation bounded by the imaged reflectors. Such an approach may be a form of seismic inversion for reservoir characterization, which may assist in generation of models of rock properties.

As an example, an inversion process can commence with forward modeling, for example, to provide a model of layers with estimated formation depths, thicknesses, densities and velocities, which may, for example, be based at least in part on information such as well log information. A model may account for compressional wave velocities and density, which may be used to invert for P-wave, or acoustic, impedance. As an example, a model can account for shear velocities and, for example, solve for S-wave, or elastic, impedance. As an example, a model may be combined with a seismic wavelet (e.g., a pulse) to generate a synthetic seismic trace.

Inversion can aim to generate a "best-fit" model by, for example, iterating between forward modeling and inversion while seeking to minimize differences between a synthetic trace or traces and actual seismic data.

As an example, a framework such as the ISIS inversion framework (Schlumberger Limited, Houston Tex.) may be implemented to perform an inversion. As an example, a framework such as the Linearized Orthotropic Inversion framework (Schlumberger Limited, Houston, Tex.) may be implemented to perform an inversion.

As mentioned above, as to seismic data, forward modeling can include receiving an earth model of acoustic impedance and an input wavelet to a synthetic seismic trace while inverting can include progressing from a recorded seismic trace to an estimated wavelet and an earth model of acoustic impedance.

As an example, another approach to forward modeling and inversion can be for measurements acquired at least in part via a downhole tool where such measurements can include one or more of different types of measurements, which may be referred to as multi-physics measurements. As an example, multi-physics measurements may include logging while drilling (LWD) measurements and/or wireline measurements. As an example, a method can include joint petrophysical inversion (e.g., inverting) for interpretation of multi-physics logging-while-drilling (LWD) measurements and/or wireline (WL) measurements.

As an example, a method can include estimating static and/or dynamic formation properties from a variety of logging while drilling (LWD) measurements (e.g., including pressure, resistivity, sonic, and nuclear data) and/or wireline (WL) measurements, which can provide for, at least, formation parameters that characterize a formation. As an example, where a method executes during drilling, LWD measurements may be utilized in a joint inversion to output formation parameters (e.g., formation parameter values) that may be utilized to guide the drilling (e.g., to avoid sticking, to diminish one or more types of formation damage, etc.).

In petroleum exploration and development, formation evaluation is performed for interpreting data acquired from a drilled borehole to provide information about the geological formations and/or in-situ fluid(s) that can be used for assessing the producibility of reservoir rocks penetrated by the borehole.

As an example, data used for formation evaluation can include one or more of core data, mud log data, wireline log data (e.g., wireline data) and LWD data, the latter of which may be a source for certain type or types of formation evaluation (e.g., particularly when wireline acquisition is operationally difficult and/or economically unviable).

As to types of measurements, these can include, for example, one or more of resistivity, gamma ray, density, neutron porosity, spectroscopy, sigma, magnetic resonance, elastic waves, pressure, and sample data (e.g., as may be acquired while drilling to enable timely quantitative formation evaluation).

Table 1, below, shows some examples of data, which may be referred to as "log" data that are associated with petrophysical and rock physics properties calculation and analysis.

TABLE 1

Examples of Log Data

| Name | Uses |
| --- | --- |
| Gamma Ray (GR) | Lithology interpretation, shale volume calculation, calculate clay volume, permeability calculation, porosity calculation, wave velocity calculation, etc. |
| Spontaneous Potential (SP) | Lithology interpretation, Rw and Rwe calculation, detect permeable zone, etc. |
| Caliper (CALI) | Detect permeable zone, locate a bad hole |
| Shallow Resistivity (LLS and ILD) | Lithology interpretation, finding hydrocarbon bearing zone, calculate water saturation, etc. |

TABLE 1-continued

Examples of Log Data

| Name | Uses |
| --- | --- |
| Deep Resistivity (LLD and ILD) | Lithology interpretation, finding hydrocarbon bearing zone, calculate water saturation, etc. |
| Density (RHOB) | Lithology interpretation, finding hydrocarbon bearing zone, porosity calculation, rock physics properties (AI, SI, $\sigma$, etc.) calculation, etc. |
| Neutron Porosity (BPHI or TNPH or NPHI) | Finding hydrocarbon bearing zone, porosity calculation, etc. |
| Sonic (DT) | Porosity calculation, wave velocity calculation, rock physics properties (AI, SI, $\sigma$, etc.) calculation, etc. |
| Photoelectric (PEF) | Mineral determination (for lithology interpretation) |

Information from one or more interpretations can be utilized in one or more manners with a system that may be a well construction ecosystem. For example, seismic data may be acquired and interpreted and utilized for generating one or more models (e.g., earth models) for purposes of construction and/or operation of one or more wells.

Figure 7:
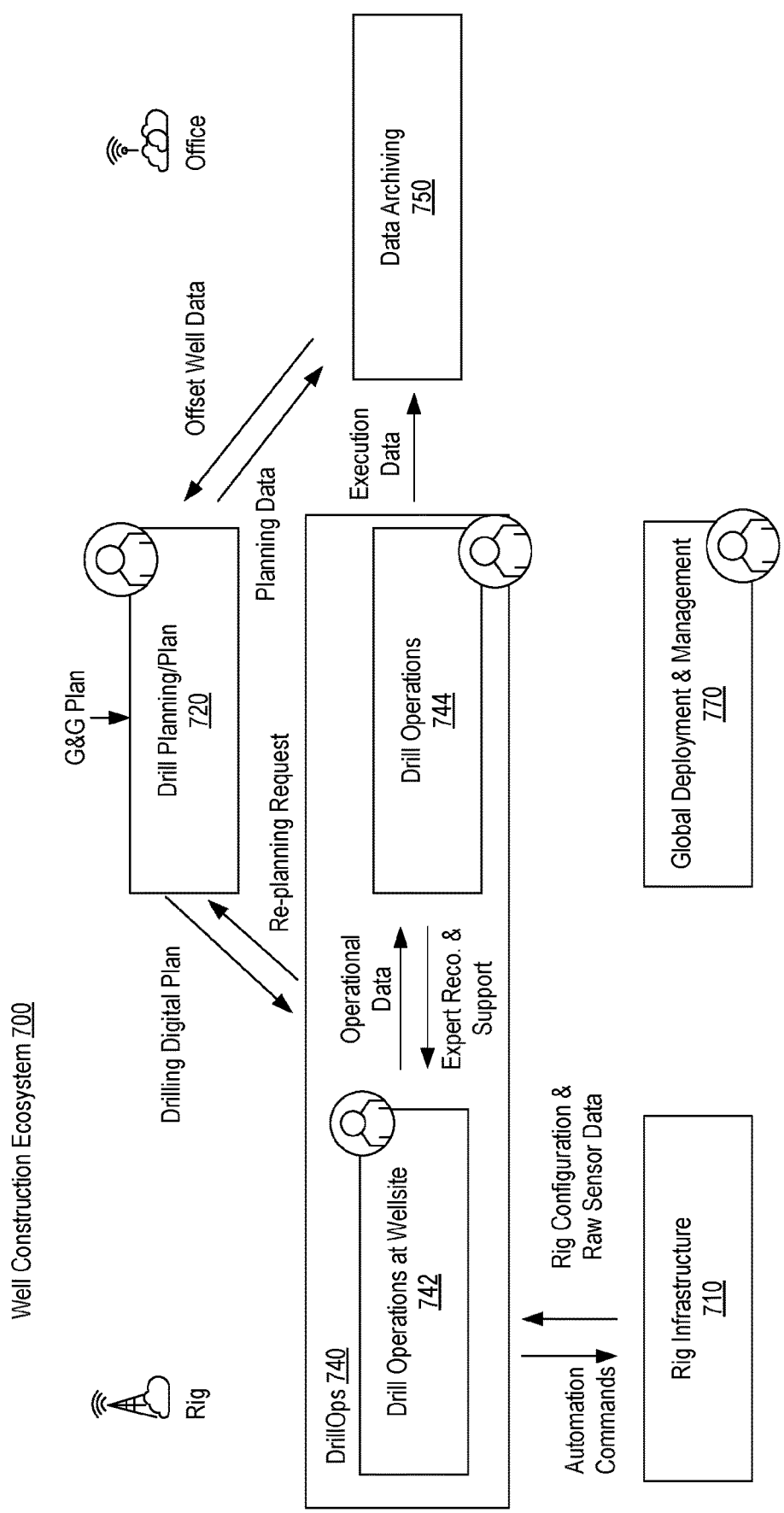
FIG. 7 illustrates an example of a system associated with well construction operations.

FIG. 7 shows an example of a system 700 that can be a well construction ecosystem. As shown, the system 700 includes rig infrastructure 710 and a drill plan component 720 that can generation or otherwise transmit information associated with a plan to be executed utilizing the rig infrastructure 710, for example, via the drilling operations layer 740, which includes a wellsite component 742 and an offsite component 744. As shown, data acquired and/or generated by the drilling operations layer 740 can be transmitted to a data archiving component 750, which may be utilized, for example, for purposes of planning one or more operations (e.g., per the drilling plan component 720. As shown, a global deployment and management component 770 can be included in the system 700.

In the example of FIG. 7, the data archiving component 750 can be an offset well search framework. For example, responsive to receipt of planning data from the drill plan component 720, the data archiving component 750 can transmit offset well data to the drill plan component 720. In such an example, the drill plan component 720 may utilize a drilling digital plan (e.g., a digital well plan) that includes information and parse that information for information that is germane to a search to be performed by the data archiving component 750. For example, where a digital well plan includes coordinates for a well to be drilled, the drill plan component 720 may parse the digital well plan and extract the coordinates and formulate a search query based at least in part on the coordinates or otherwise transmit the coordinates to the data archiving component 750 such that offset well data can be accessed and returned to the drill plan component 720. In such an example, the drill plan component 720 may generate a new digital well plan (e.g., a revised digital well plan) based at least in part on at least a portion of the offset well data. As indicated, the drill plan component 720 can be operatively coupled to the drill operations component 740. In such an example, data output by the drill operations component 740 may be transmitted to the data archiving component 750 and, for example, stored in one or more data storage devices (e.g., database(s)/server(s)) in association with a well for which drilling operations are being performed in the field. In such an example, the data archiving component 750 can be a real-time component that operates as part of the ecosystem 700 for planning and performing field operations. As an example, a digital well plan can include instructions that can generate one or more signals that can be transmitted to one or more pieces of field equipment to control one or more actions thereof with respect to a field operation or operations. For example, a digital well plan can include directional drilling instructions that can be transmitted to rig equipment that performs directional drilling via a BHA. Where the digital well plan is enhanced by offset well data, the directional drilling can be performed in a more effective manner. For example, the offset well data may include information as to pressures, lithologies, temperatures, etc., such that the digital well plan can be configured to call for performance of one or more drilling operations that account for pressure at a depth, lithology at a depth, temperature at a depth, etc.

As an example, a field may be a land field (onshore) or a marine field (offshore) or a combination of both. As to seismic surveys, a survey may be a land survey, a marine survey or a combination of both. A project can include performing pre-survey tasks, survey tasks, interpretation tasks, post-interpretation tasks, additional survey tasks (e.g., other parameters, other regions, four-dimensional with respect to three-dimensions in space and a dimension in time, etc.).

As an example, a project may involve hundreds of tasks or more, which may be distributed in time and space (e.g., locations where tasks are to occur, etc.).

As an example, FIG. 8 shows an example of a geologic environment 801 that includes a seabed 803 and a sea surface 805. As shown, equipment 810 such as a ship may tow an energy source 820 and a string of sensors 830 at a depth below the sea surface 805. In such an example, the energy source 820 may emit energy at a time T0, a portion of that energy may be reflected from the seabed 803 at a time T1 and a portion of that reflected energy may be received at the string of sensors 830 at a time T2.

As mentioned, a seismic wave may be a primary or a multiple. As shown in an enlarged view of the geologic environment 801, the sea surface 805 may act to reflect waves such that sensors 832 of the string of sensors 830 may sense multiples as well as primaries. In particular, the sensors 832 may sense so-called sea surface multiples, which may be multiples from primaries or multiples of multiples (e.g., due to sub-seabed reflections, etc.).

As an example, each of the sensors 832 may sense energy of an upgoing wave at a time T2 where the upgoing wave reflects off the sea surface 805 at a time T3 and where the sensors may sense energy of a downgoing multiple reflected wave at a time T4 (see also data 840 of FIG. 8). In such an example, sensing of the downgoing multiple reflected wave may be considered noise that interferes with sensing of one or more upgoing waves. As an example, an approach that includes summing data acquired by a geophone and data acquired by a hydrophone may help to diminish noise associated with downgoing multiple reflected waves. Such an approach may be employed, for example, where sensors may be located proximate to a surface such as the sea surface 805 (e.g., arrival times T2 and T4 may be relatively close). As an example, the sea surface 805 or a water surface may be an interface between two media. For example, consider an air and water interface. As an example, due to differing media properties, sound waves may travel at about 1,500 m/s in water and at about 340 m/s in air. As an example, at an air and water interface, energy may be transmitted and reflected.

As an example, each of the sensors 832 may include at least one geophone 834 and a hydrophone 836. As an example, a geophone may be a sensor configured for seismic acquisition, whether onshore and/or offshore, that can detect velocity produced by seismic waves and that can, for example, transform motion into electrical impulses. As an example, a geophone may be configured to detect motion in a single direction. As an example, a geophone may be configured to detect motion in a vertical direction. As an example, three mutually orthogonal geophones may be used in combination to collect so-called 3C seismic data. As an example, a hydrophone may be a sensor configured for use in detecting seismic energy in the form of pressure changes under water during marine seismic acquisition. As an example, hydrophones may be positioned along a string or strings to form a streamer or streamers that may be towed by a seismic vessel (e.g., or deployed in a bore). Thus, in the example of FIG. 8, the at least one geophone 834 can provide for motion detection and the hydrophone 836 can provide for pressure detection. As an example, the data 840 (e.g., analog and/or digital) may be transmitted via equipment, for example, for processing, etc.

As an example, a method may include analysis of hydrophone response and vertical geophone response, which may help to improve a PZ summation, for example, by reducing receiver ghost (e.g., deghosting) and/or free surface-multiple noise contamination. As an example, a ghost may be defined as a reflection of a wavefield as reflected from a water surface (e.g., water and air interface) that is located above a receiver, a source, etc. (e.g., a receiver ghost, a source ghost, etc.). As an example, a receiver may experience a delay between an upgoing wavefield and its downgoing ghost, which may depend on depth of the receiver.

As an example, a surface marine cable may be or include a buoyant assembly of electrical wires that connect sensors and that can relay seismic data to the recording seismic vessel. As an example, a multi-streamer vessel may tow more than one streamer cable to increase the amount of data acquired in one pass. As an example, a marine seismic vessel may be about 75 m long and travel about 5 knots, for example, while towing arrays of air guns and streamers containing sensors, which may be located, for example, about a few meters below the surface of the water. A so-called tail buoy may assist crew in location an end of a streamer. As an example, an air gun may be activated periodically, such as about intervals of 25 m (e.g., about intervals of 10 seconds) where the resulting sound wave travels into the Earth, which may be reflected back by one or more rock layers to sensors on a streamer, which may then be relayed as signals (e.g., data, information, etc.) to equipment on the tow vessel.

In the example of FIG. 8, the equipment 810 may include a system such as the system 850. As shown in FIG. 8, the system 850 includes one or more information storage devices 852, one or more computers 854, one or more network interfaces 860 and one or more sets of instructions 870. As to the one or more computers 854, each computer may include one or more processors (e.g., or processing cores) 856 and memory 858 for storing instructions (e.g., consider one or more of the one or more sets of instructions 870), for example, executable by at least one of the one or more processors. As an example, a computer may include one or more network interfaces (e.g., wired or wireless), one or more graphics cards, a display interface (e.g., wired or wireless), etc.

As an example, pressure data may be represented as "P" and velocity data may be represented as "Z". As an example, a hydrophone may sense pressure information and a geophone may sense velocity information. As an example, hydrophone may output signals, optionally as digital data, for example, for receipt by a system. As an example, a geophone may output signals, optionally as digital data, for example, for receipt by a system. As an example, the system 850 may receive P and Z data via one or more of the one or more network interfaces 860 and process such data, for example, via execution of instructions stored in the memory 858 by the processor 856. As an example, the system 850 may store raw and/or processed data in one or more of the one or more information storage devices 852.

As an example, a method can include processing time lapse geophysical data such as 4D seismic data. For example, consider a survey as in FIG. 8 where the survey is repeated at a later time such that changes in a subsurface formation may be tracked, optionally responsive to production, injection, etc.

As an example, data of a 4D seismic survey can be interpreted to determine effects of production related changes to an environment. For example, as fluid is produced from a reservoir, changes may occur such that one or more layers above the reservoir become depressed as support from the fluid is lessened over time. As an example, such an effect may be modeled and perturbed to generate a plurality of realizations that may be utilized for training a deep learning framework. In such an example, the trained deep learning framework may recognize one or more types of structural changes that may be associated with one or more physical phenomena (e.g., production, injection, etc.). As an example, a method can take a time lapse difference in one or more areas where no production related change is expected.

An algorithm may provide for extraction of 2D slices through a 3D volume (e.g., a geophysical data cube, etc.). Such an approach may, for example, extract/select vertical 2D slices; noting that a method may provide for one or more dips that can be utilized to extract/select (e.g., utilizing moderate dip angles). As an example, such an approach may be applied in a higher dimensional sense. For example, consider utilization of higher dimensional data and/or higher dimensional 3D networks or higher.

As to processing of seismic data, processing can include on-site processing and off-site processing. For example, a vessel that tows streamers can include processing resources that can process at least a portion of acquired data. Such processing may be for noise, data compression, data error adjustments, data cleansing, etc. As an example, a vessel may include equipment for satellite communications where data can be transmitted from the vessel to a satellite and then from a satellite network to a remote site for computations, storage, etc.

As an example, site equipment and/or remote equipment may include one or more frameworks that are computational frameworks for processing of seismic data.

Figure 9:
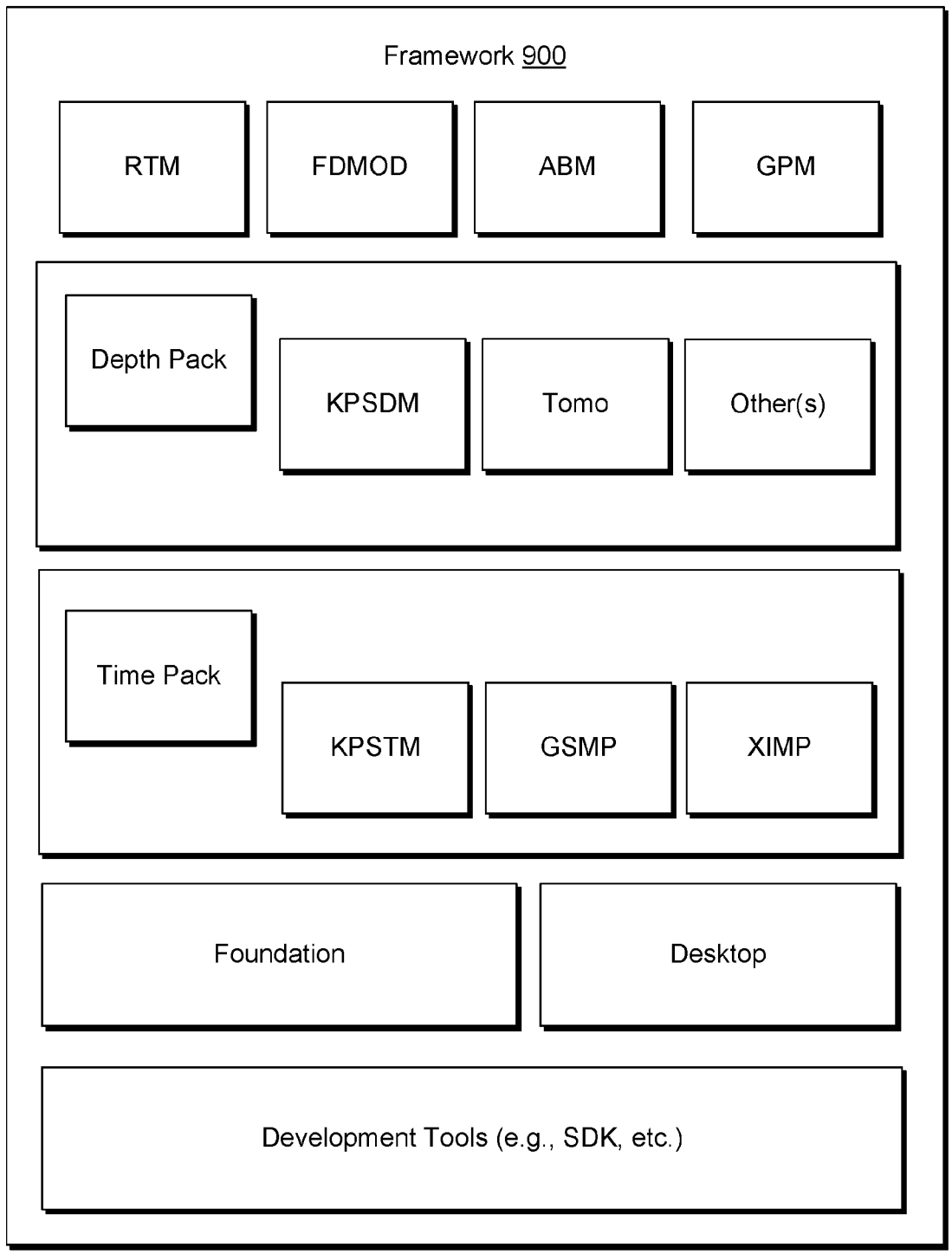
FIG. 9 illustrates an example of a computational framework.

FIG. 9 shows an example of a computational framework 900 that can include one or more processors and memory, as well as, for example, one or more interfaces. The computational framework of FIG. 9 can include one or more features of the OMEGA framework (Schlumberger Limited, Houston, Tex.), which includes finite difference modelling (FDMOD) features for two-way wavefield extrapolation modelling, generating synthetic shot gathers with and without multiples. The FDMOD features can generate synthetic shot gathers by using full 3D, two-way wavefield extrapolation modelling, which can utilize wavefield extrapolation logic matches that are used by reverse-time migration (RTM). A model may be specified on a dense 3D grid as velocity and optionally as anisotropy, dip, and variable density.

As shown in FIG. 9, the computational framework 900 includes features for RTM, FDMOD, adaptive beam migration (ABM), Gaussian packet migration (GPM), depth processing (e.g., Kirchhoff prestack depth migration (KPSDM), tomography (Tomo)), time processing (e.g., Kirchhoff prestack time migration (KPSTM), general surface multiple prediction (GSMP), extended interbed multiple prediction (XIMP)), framework foundation features, desktop features (e.g., GUIs, etc.), and development tools.

The framework 900 can include features for geophysics data processing. The framework 900 can allow for processing various types of data such as, for example, one or more of: land, marine, and transition zone data; time and depth data; 2D, 3D, and 4D surveys; isotropic and anisotropic (TTI and VTI) velocity fields; and multicomponent data.

The framework 900 can allow for transforming seismic, electromagnetic, microseismic, and/or vertical seismic profile (VSP) data into actionable information, for example, to perform one or more actions in the field for purposes of resource production, etc. The framework 900 can extend workflows into reservoir characterization and earth modelling. For example, the framework 900 can extend geophysics data processing into reservoir modelling by integrating with the PETREL framework via the Earth Model Building (EMB) tools, which enable a variety of depth imaging workflows, including model building, editing and updating, depth-tomography QC, residual moveout analysis, and volumetric common-image-point (CIP) pick QC. Such functionalities, in conjunction with the framework's depth tomography and migration algorithms, can produce accurate and precise images of the subsurface. The framework 900 may provide support for field to final imaging, to prestack seismic interpretation and quantitative interpretation, from exploration to development.

As an example, the FDMOD component can be instantiated via one or more CPUs and/or one or more GPUs for one or more purposes. For example, consider utilizing the FDMOD for generating synthetic shot gathers by using full 3D, two-way wavefield extrapolation modelling, the same wavefield extrapolation logic matches that are used by reverse-time migration (RTM). FDMOD can model various aspects and effects of wave propagation. The output from FDMOD can be or include synthetic shot gathers including direct arrivals, primaries, surface multiples, and interbed multiples. The model can be specified on a dense 3D grid as velocity and optionally as anisotropy, dip, and variable density. As an example, survey designs can be modelled to ensure quality of a seismic survey, which may account for structural complexity of the model. Such an approach can enable evaluation of how well a target zone will be illuminated. Such an approach may be part of a quality control process (e.g., task) as part of a seismic workflow. As an example, a FDMOD approach may be specified as to size, which may be model size. Such a parameter can be utilized in determining resources to be allocated to perform a FDMOD related processing task. For example, a relationship between model size and CPUs, GPUs, etc., may be established for purposes of generating results in a desired amount of time, which may be part of a plan (e.g., a schedule) for a seismic interpretation workflow.

A single streamer (SSD) feature of the framework 900 can be utilized, for example, to perform one or more of dephasing of a cable response; minimizing amplitude spectral notches within the limits of the ambient noise; redatuming of data to single depth (e.g., user-selected). Such tasks may be achieved by a 2D spectral reconstruction inversion operator in the shot domain. An SSD algorithm can read real cable depth headers to initiate an inversion process. Once SSD is applied, the data's wavelet shape and timing can be stable across offset. The data can then be suitable for further processing, such as velocity analysis and surface-related multiple elimination (SRME)/general surface multiple prediction (GSMP) demultiple and imaging. The SSD feature may be utilized for one or more of wavefield separation of flat or slanted streamer acquisition data, enhancement of bandwidth and frequency content of existing marine seismic data, source deghosting in the receiver domain, etc.

As an example, a marine survey can include various tasks that include data storage tasks, transmission tasks and processing tasks. In such an example, an ecosystem can include one or more types of networks, which may include one or more satellite networks. As an example, a network may be operatively coupled to a cloud network, which includes various resources. In such an example, a vessel may interact with a cloud network while at sea, while in port, etc. As an example, a vessel may offload data in port such that the data are communicated to one or more networks, which can include a cloud network.

As an example, as survey data become available, interpretation tasks may be performed for building, adjusting, etc., one or more models of a geologic environment. For example, consider a vessel that transmits a portion of acquired data while at sea and that transmits a portion of acquired data while in port, which may include physically offloading one or more storage devices and transporting such one or more storage devices to an onshore site that includes equipment operatively coupled to one or more networks (e.g., cable, etc.). As data are available, options exist for tasks to be performed.

Figure 10:
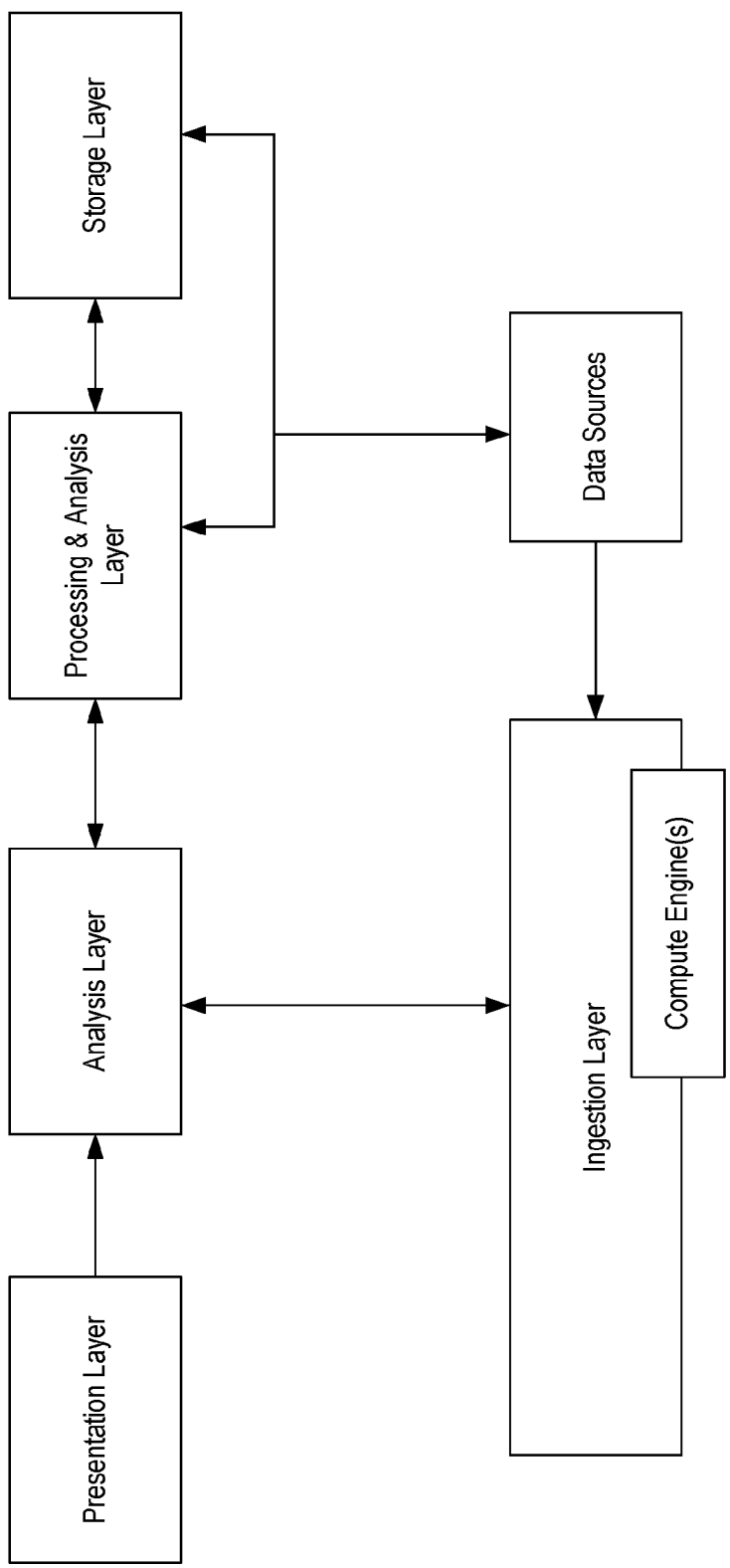
FIG. 10 illustrates an example of cloud architecture.

FIG. 10 shows an example of a cloud architecture 1000, for example, consider a GOOGLE cloud architecture (Google LLC, Mountain View, Calif.); noting that another architecture or vendor of cloud services may be utilized (e.g., AZURE cloud architecture, Microsoft Corporation, Redmond, Wash.). As shown, the architecture 1000 includes various resources, where the example of FIG. 10 shows some examples, noting that customized resources may be implemented in such an architecture. For example, consider a framework such as the framework 900 of FIG. 9 being implemented in the architecture 1000 of FIG. 10. In such an example, one or more instances of the framework 900 may be instantiated on resources that are provisioned, for example, in real-time according to demand and/or according to a schedule or schedules. As shown, resources include storage and compute resources, which may be appropriately provisioned. As an example, provisioning may occur based on information acquired from equipment at a site or sites, receipt of data from a site or sites, etc. For example, consider a planning framework that may be at least in part cloud-implemented that can track operations of a vessel, which can include spatial operations and/or data operations. Such a planning framework may receiving weather and/or sea conditions such that timing of the vessel arriving in a port may be determined where such timing (e.g., a docking time) may be utilized to provision resources for one or more of data-offloading (e.g., data transmission) and data processing. In such an example, the planning framework may include provisioning one or more instances of the framework 900 of FIG. 9 for use by one or more individuals that are to perform interpretation task based at least in part on the data and/or processing thereof. As an example, a task may be a model building or adjustment task, a simulation task, a survey analysis task, etc. As an example, a task as to interpretation can include picking one or more horizons from one or more seismic images rendered to a display. As an example, a task can include computing one or more seismic attributes. As an example, a task can include utilizing one or more features of the framework 900.

As an example, a planning framework and/or other computational framework may include one or more analysis engines. As an example, an analysis engine can include one or more features of the APACHE STORM engine (Apache Software Foundation, Forest Hill, Md.). As an example, a method can include implementing a topology that includes a directed acyclic graph. For example, the APACHE STORM application can include utilization of a topology that includes a directed acyclic graph (DAG). A DAG can be a finite directed graph with no directed cycles that includes many vertices and edges, with each edge directed from one vertex to another, such that there is no way to start at any vertex v and follow a consistently-directed sequence of edges that eventually loops back to v again. As an example, a DAG can be a directed graph that includes a topological ordering, a sequence of vertices such that individual edges are directed from earlier to later in the sequence. As an example, a DAG may be used to model different kinds of information. As another example, an analysis engine can include one or more features of the NETICA framework (Norsys Software Corp., Vancouver, Canada), which includes features that generate and use networks to perform various kinds of inference where, for example, given a scenario with limited knowledge, appropriate values or probabilities may be determined for unknown variables. As yet another example, an analysis engine can include one or more features of the TENSOR FLOW (Google, Mountain View, Calif.) framework, which includes a software library for dataflow programming that provides for symbolic mathematics, which may be utilized for machine learning applications such as artificial neural networks (ANNs), etc. (e.g., an ANN block can be included in the analysis layer of the architecture 1000 of FIG. 10).

As an example, a framework can apply plan-based automation to seismic data processing to create a robust, flexible automated system, which allocates cloud compute and human resources to a large number of tasks while respecting operational constraints (e.g., time related constraints, etc.) and minimizes cost (e.g., cloud compute cost).

As mentioned, seismic data processing at the scale performed in the oilfield services industry involves the coordination of thousands of processing jobs across dozens of projects against a limited pool of compute and storage resources. This in itself is a challenging problem, but to complicate matters, different processing steps may demand specific hardware and storage configurations for optimal performance. For example, some algorithms are designed to operate on GPUs, others may demand a higher ratio of memory to cores, while others may demand substantial amounts of local storage. Coordinating project timelines with optimal scheduling of compute and storage resources quickly becomes a massively complex challenge that can impact the operations of a processing center.

Artificial intelligence (AI) planning (AIP) is a technology that can be implemented to find a solution or solutions where a large number of choices may exist. AIP can implement a heuristic-guided forward search. A result can be a plan (e.g., a set of instructions along a time-line annotated with relevant operational constraints) that can be robustly dispatched to machines and/or humans involved. The operational constraints (e.g., compliance, safety, deadlines, etc.) can be monitored by the automated dispatching system to detect plan failures and dynamically trigger re-planning. As mentioned, one or more analysis engines may provide AI resources for purposes of AIP or other analyses.

As an example, a planning framework can include implementation of one or more planning domain definition languages (PDDLs). An article by Fox, M., and Long, D. 2003. PDDL2.1: An extension to PDDL for expressing temporal planning domains. Journal of Artificial Intelligence Research 20 (2003) 61-124, is incorporated by reference herein.

As an example, seismic processing projects can be defined as flow-charts of processing tasks, which are farmed out to a processing computer cluster/cloud (see, e.g., FIG. 10). With multiple projects processed in parallel, there can be thousands of tasks to be scheduled. Tasks may demand different type of hardware to run on. Some tasks may not be computational, but involve issuing instructions (e.g., signals, etc.) to equipment that can notify a human. Humans tend to work 8 hours a day and projects can have negotiated deadlines and budget limits.

As an example, one or more workflows can be modeled using Planning Domain Description Language (PDDL) as a temporal planning problem. A Planning Engine can take a PDDL model as input, description of the current state of the processing, machines, human workers and computes a plan that suggests order of processing of all tasks across projects and decides how much computational resources are to be assigned to each task.

As an example, a plan can be a machine-readable file or files that is or are executed by a component such as a plan dispatcher. Such a plan may be described with appropriate conditions that are to be monitored by the plan dispatcher to ensure constraints are respected.

As the current way of manually scheduling and monitoring processing jobs tends not to be readily scalable, a planning framework can be utilized for scheduling and monitoring.

Figure 11:
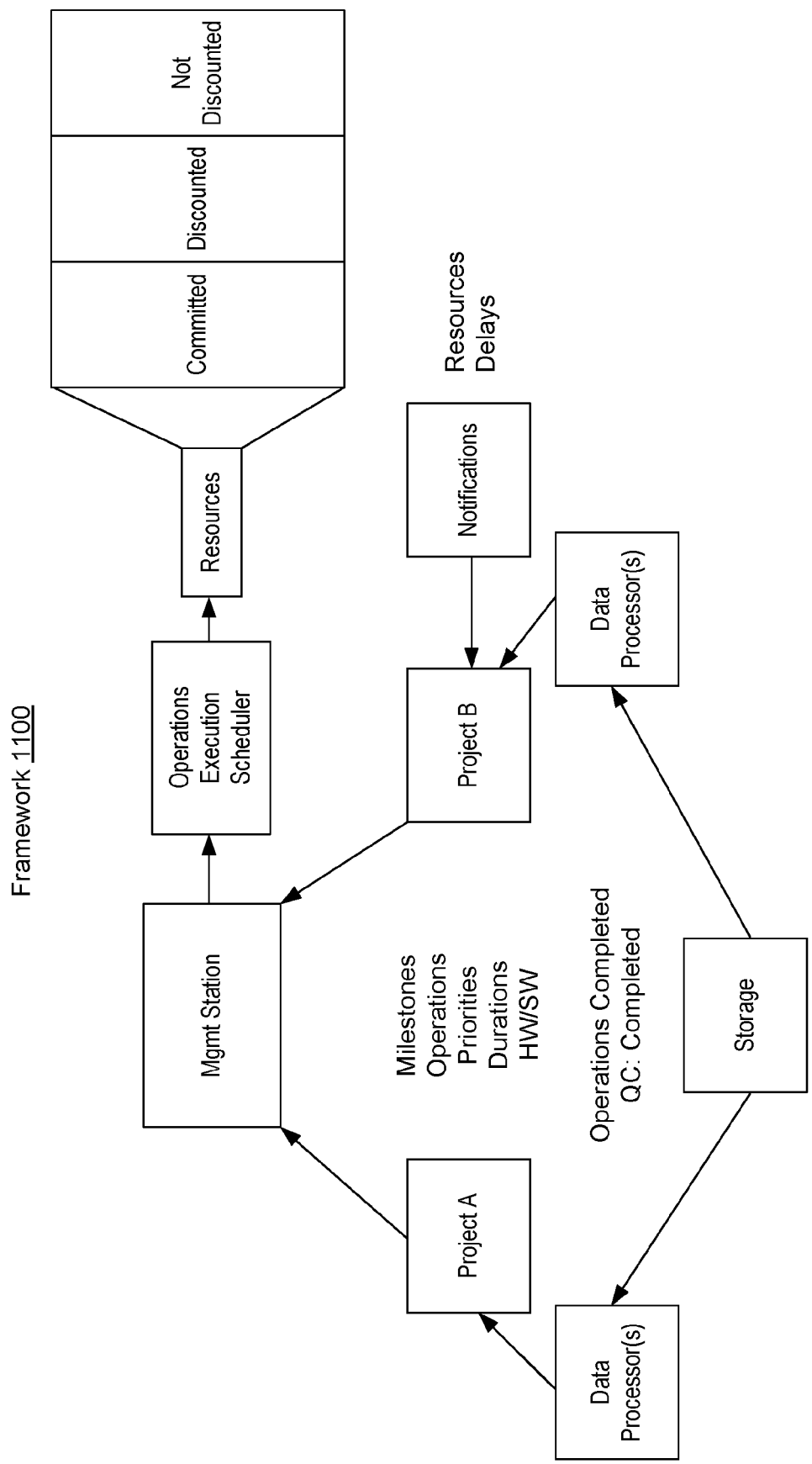
FIG. 11 illustrates an example of a framework.

FIG. 11 shows an example of a framework 1100 representative of a manual management of task queuing across multiple processing projects. In the framework 1100, project managers manually maintain their schedules using software such as MICROSOFT PROJECT software. A management station with a manager manually levels requests of the project managers for resources and queues tasks.

As an example, various operations can be formalized into the PDDL model (domain.pddl file). For example, an outstanding list of processing projects and constraints can be described into a problem *.pddl file. These two files can be processed by a planning engine and produce a plan that respects constraints.

As an example, a dispatcher can be a computational framework with various features. For example, a dispatcher can include at least one interface for receiving or otherwise accessing a digital operational plan, which can include computational tasks for a variety of workflows where each workflow may be associated with a project or projects. For example, a digital operational plan can include information for Project A and Project B where resources in one or more pools of resources can be provisioned to perform tasks of a workflow for Project A and where resources in one or more pools of resources can be provisioned to perform tasks of a workflow for Project B. In such an example, the dispatcher can utilize specifications in the digital operational plan for provisioning and, for example, to monitor execution of computational tasks where execution utilizes provisioned resources. In such an example, the dispatcher is dynamic and can respond to conditions that can arise. Such conditions may include data related conditions (e.g., access to data being faster or slower, amount of data being lesser or greater, data format conditions, etc.), human related conditions (e.g., a person performing or not performing a quality control process with or without issues, a person available or unavailable, etc.), algorithmic related conditions (e.g., a change in a processing algorithm for migration of seismic data, a change in a processing algorithm for a seismic attribute, etc.), etc.

As an example, a dispatcher can receive a digital operational plan that specifies execution information, which may pertain to information germane to one or more workflows such as performance of the one or more workflows or particular tasks therein. As an example, a dispatcher may include application programming interface (API) information such that one or more API calls can be formulated and issued to acquire specified execution information. For example, consider an API call issued from a dispatcher to a cloud platform that can return information germane to execution of a computational task using one or more resources of the cloud platform, which may be provisioned via one or more instructions issued to the cloud platform by the dispatcher. In such an approach, the dispatcher can be configured via the digital operational plan to monitor the computational execution of tasks via requests for particular execution information and, for example, make one or more decisions based at least in part on received execution information.

As an example, consider a digital operational plan that specifies a task of a workflow to be performed using a graphics processing unit (GPU or graphics processor). In such a digital operational plan, the task may be specified for execution with monitoring such that a dispatcher can formulate a request for one or more metrics of a GPU during execution of the task. For example, consider a scenario where a dispatcher provisions resources such as GPUs in a GOOGLE KUBERNETES ENGINE (GKE) cluster to perform a task of a workflow. In such an example, consider the following instructions to create an autoscaling node pool, p100, with two P100 GPUs, in a cluster p100-cluster:

gcloud container node-pools create p100 \
    accelerator type=nvidia-tesla-p100,count=2 \
    zone us-central1-c—cluster p100-cluster \
    num-nodes 3—min-nodes 0—max-nodes 5—enable-autoscaling In the foregoing example, the type of GPUs is NVIDIA TESLA P100 GPUs and an autoscaling feature is enabled, which allows the node pool to autoscale when workload demand changes.

In the foregoing example, the dispatcher can cause a cloud platform to create node pools equipped with GPUs (e.g., NVIDIA TESLA K80, P100, P4, V100, T4, etc. or other GPUs). Such GPUs can provide compute power to drive one or more tasks (e.g., image recognition, image processing, etc.). As an example, a seismic data processing task may be performed using one or more GPUs.

As to monitoring GPUs, in the GKE example, GKE exposes various Stackdriver Monitoring metrics for containers using GPUs that can be utilized to monitor GPU workload performance such as, for example, one or more of: Duty Cycle (container/accelerator/duty_cycle) as percentage of time over the past sample period (10 seconds) during which the accelerator was actively processing (e.g., between 1 and 100); Memory Usage (container/accelerator/memory_used) as amount of accelerator memory allocated in bytes; and Memory Capacity (container/accelerator/memory_total) as total accelerator memory in bytes.

As to the GKE, Table 2 below shows metric type names that can be prefixed with container.googleapis.com/.

TABLE 2

Example Metrics

| Metric type<br>Launch stage, Display name<br>Kind, Type, Unit | Description<br>Labels |
|---|---|
| container/accelerator/duty_cycle<br>GA Accelerator duty cycle<br>GAUGE, INT64, 1 | Percent of time over the past sample period (10 s) during which the accelerator was actively processing. Sampled each 60 seconds.<br>make: Make of the accelerator (e.g. NVIDIA)<br>accelerator_id: ID of the accelerator<br>model: Model of the accelerator (e.g. 'Tesla P100') |
| container/accelerator/memory_total<br>GA Accelerator memory total<br>GAUGE, INT64, By | Total accelerator memory in bytes. Sampled each 60 seconds.<br>make: Make of the accelerator (e.g. NVIDIA)<br>accelerator_id: ID of the accelerator<br>model: Model of the accelerator (e.g. 'Tesla P100') |
| container/accelerator/memory_used<br>GA Accelerator memory used<br>GAUGE, INT64, By | Total accelerator memory allocated in bytes. Sampled each 60 seconds.<br>make: Make of the accelerator (e.g. NVIDIA)<br>accelerator_id: ID of the accelerator<br>model: Model of the accelerator (e.g. 'Tesla P100') |
| container/accelerator/request<br>GA Request accelerators<br>GAUGE, INT64, {devices} | Number of accelerator devices requested by the container. Sampled each 60 seconds.<br>resource_name: Name of the requested accelerator resource. |
| container/cpu/reserved_cores<br>GA Reserved cores<br>GAUGE, DOUBLE, 1 | Number of cores of CPU reserved for the container. If no core limit is set, this will be zero. Sampled each 60 seconds. Cumulative CPU usage on all cores in seconds. This number divided by the elapsed time represents usage as a number of cores, regardless of any core limit that might be set. Sampled each 60 seconds. |
| container/cpu/usage_time<br>GA CPU usage<br>CUMULATIVE, DOUBLE, s | |
| container/cpu/utilization<br>GA CPU utilization<br>GAUGE, DOUBLE, % | The percentage of the allocated CPU that is currently in use on the container. If no core limit is set, then this metric is not set. Sampled each 60 seconds. After sampling, data is not visible for up to 360 seconds. |
| container/disk/bytes_total<br>GA Disk capacity<br>GAUGE, INT64, By | Total number of bytes of capacity on the disk identified by label 'device_name'. Sampled each 60 seconds.<br>device_name: The device name for the disk (e.g. '/dev/sda1'). |
| container/disk/bytes_used<br>GA Disk usage<br>GAUGE, INT64, By | Total number of bytes used on the disk identified by label 'device_name'. Sampled each 60 seconds.<br>device_name: The device name for the disk (e.g. '/dev/sda1'). |
| container/memory/bytes_total<br>GA Memory limit<br>GAUGE, INT64, By | Memory limit of the container in bytes. Sampled each 60 seconds. |
| container/memory/bytes_used<br>GA Memory usage<br>GAUGE, INT64, By | Memory usage in bytes, broken down by type: evictable and non-evictable. Sampled each 60 seconds. |

TABLE 2-continued

Example Metrics

| Metric type<br>Launch stage, Display name<br>Kind, Type, Unit | Description<br>Labels |
|---|---|
| | memory_type: Either 'evictable' or 'non-evictable'. Evictable memory is memory that can be easily reclaimed by the kernel, while non-evictable memory cannot. |
| container/memory/page_fault_count<br>GA Page faults<br>DELTA, INT64, 1 | Number of page faults, broken down by type: major and minor. Sampled each 60 seconds. After sampling, data is not visible for up to 360 seconds.<br>fault_type: Fault type—either 'major' or 'minor', with the former indicating that the page had to be loaded from disk. |
| container/uptime<br>GA Uptime<br>CUMULATIVE, DOUBLE, s | Number of seconds since the container started. Sampled each 60 seconds. |

The forgoing metrics are some examples that may be utilized in some instances. As to metrics that may be available via requests such as in APIs, consider one or more of the GOOGLE CLOUD PLATFORM (GCP) Metrics List (see, e.g., services such as Compute Engine and GOOGLE BigQuery); Agent Metrics List, from VM instances running the stackdriver agents; AMAZON WEB SERVICES (AWS) Metrics List; and metrics that may be user-defined metrics (e.g., custom metrics, etc.).

As an example, a method can include receiving a digital operational plan, issuing instructions to provision resources to execute one or more tasks in the digital operational plan and issuing one or more requests for one or more metrics of the provisioned resources. Such metrics can be execution information metrics. As an example, a dispatcher may perform such a method where one or more APIs are utilized to issue requests as API calls and where one or more metrics are received by the dispatcher in response.

As mentioned, a digital operational plan can be generated using a domain language such as, for example, a PDDL.

FIG. 12 shows an example of a portion of a framework 1200, specifically an example of PDDL formalism for seismic processing as to one or more seismic interpretation workflows, etc. As shown, the framework can include a graphical user interface (GUI) that can be rendered to a display. In the example of FIG. 12, a domain file is on the left, a problem file (including current state, goal and objective function) is in the middle and a resulting plan is on the right. Such plan can be executed by a plan dispatcher, which can continuously monitor the execution. Such a plan dispatcher can be implemented utilizing cloud resources to control cloud resources (e.g., provisioning, instantiation, etc.).

In the example of FIG. 12, the plan is expressed via statements in the VISUAL STUDIO framework (Microsoft Corporation, Redmond, Wash.). The GUI includes facilities for file selection, editing, text selection, various views, code execution, debugging, tasks and help. Various tabs are included such as, for example, a domain.pddl tab, a text file tab, a JSON tab (JavaScript Object Notation), a problem tab, etc.

FIG. 13 shows a GUI portion 1300 of the framework GUI 1200 of FIG. 12. As shown, a definition statement provides for a domain "seismic" as associated with seismic interpretation. Various statements provide for "requirements", "types", "predicates", "functions" and "actions". Actions can include handle actions, allocation actions, deallocation actions, performance actions to perform one or more tasks, etc. As an example, consider an allocation action to allocate a machine from available CPUs, GPUs, etc. (e.g., processor cores, etc.) and a deallocation action to deallocate a machine to return resources to a free pool of resources. As an example, a durative-action statement can be executed to perform a task using a pre-allocated machine from a pool.

As explained, a task can be associated with one or more aspects of a workflow associated with seismic data (e.g., a survey, data transmission, data processing, instantiating a framework such as the OMEGA framework, etc.). As an example, an action can include issuing an instruction to acquire information as to location of a vessel at sea that is performing a marine survey, which may be part of a 4D seismic survey. In such an example, logic may be implemented to determine an estimated time as to availability of seismic data from the marine survey. As an example, where such a survey is a 4D seismic survey, seismic data (e.g., or data based thereon such as seismic attributes, etc.) may be staged for use in performing one or more tasks that are to compare data with respect to time, for example, to determine how an underground formation has responded to fluid movement(s) (e.g., production, injection, etc.). As to staging, a task can include accessing previously processed data from a data storage device and instantiating a framework that can perform comparison(s) of data from a 4D seismic survey. In such an example, a machine or machines may be ready for arrival of the vessel in a port where it can offload data via a network such as a land-based network that has a sufficiently large bandwidth (e.g., compared to a satellite network which may be limited in bandwidth, expensive, weather-dependent, etc.). As an example, a GUI may be rendered to a display that illustrates timings and tasks, for example, when a vessel may be expected to offload data from a seismic survey.

FIG. 14 shows a GUI portion 1400 of the framework GUI 1200 of FIG. 12. As shown, a problem2.ppdl tab is selected that defines a problem in PDDL, referred to as problem "seismic1", with respect to the domain "seismic". As shown, requirements can be specified, along with objects, initializations, goals, etc. As an example, an optimization algorithm may be expressed for execution to minimize one or more aspects of the defined "problem". As shown in FIG. 14, the tasks can be expressed in relationship to resources for performing such tasks. In the example of FIG. 14, tasks 1 to 8 are specified, some of which include information as to GPUs.

Figure 15:
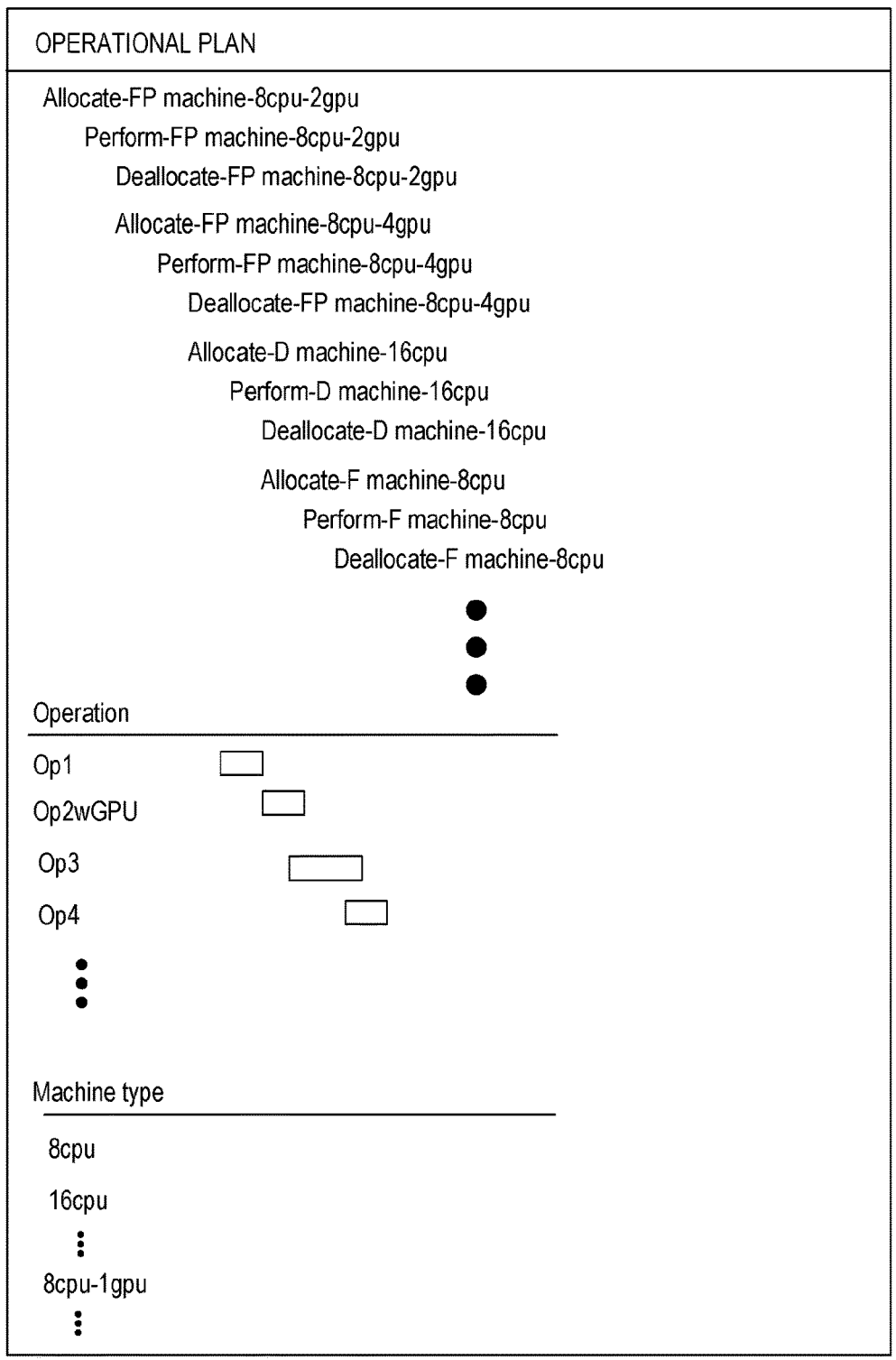
FIG. 15 illustrates a portion of the graphical user interface of FIG. 12.

FIG. 15 shows a GUI portion 1500 of the framework GUI 1200 of FIG. 12. As shown, a plan tab is selected where various information is rendered, which can include color coding for one or more purposes (e.g., timing, amount of resources, performance state, etc.). The plan includes information such as, for example: allocate-fullprice machine-8cpu-2gpu; perform-fullprice task1 machine-8cpu-2gpu; deallocate-fullprice machine-8cpu-2gpu; allocate-fullprice machine-8cpu-4gpu; perform-fullprice task2needsgpu machine-8cpu-4gpu; etc. As shown, various tasks can be executed utilizing CPUs and/or GPUs as resources, which can be allocated and/or deallocated, for example, in a cloud of resources (see, e.g., the cloud architecture 1000 of FIG. 10).

Figure 16:
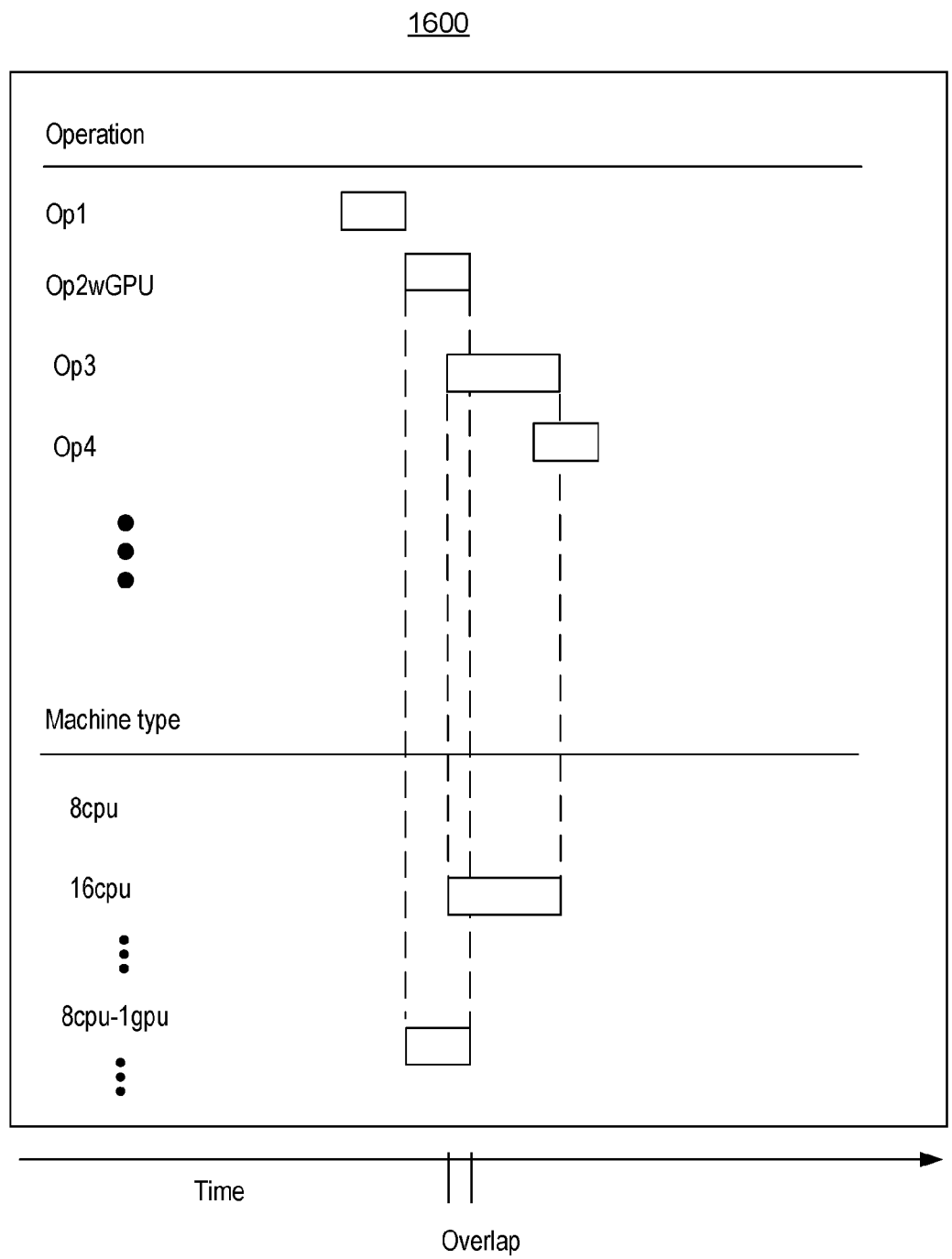
FIG. 16 illustrates a portion of the graphical user interface of FIG. 12.

FIG. 16 shows a GUI portion 1600 of the framework GUI 1200 of FIG. 12. As shown in FIG. 16, tasks are rendered with respect to time as a schedule, which can be adapted, adjusted, etc., as information is acquired, tasks performed, resources allocated/deallocated, etc. As shown, machine-type information may be rendered, which may be specific to number of CPUs, number of GPUs, number of CPUs and number of GPUs, etc. As may be appreciated, various seismic interpretation workflows involve handling of multidimensional data sets, which may include seismic cubes (e.g., 3D arrays of seismic data, which may be seismic traces, seismic attributes, etc.). Operations associated with interpretation can include slicing a cube to render a slice to a display, flying through slices of a cube to follow a geologic structure (e.g., a horizon, a fault, a geobody, etc.). Various operations may be amenable to GPU types of processes that provide for processing of volumetric data for purposes of rendering information, views, etc., to a display or displays. In the example of FIG. 16, a timeline is shown, which may indicate one or more specific overlaps as to operations and/or resources. Such an analysis may provide indications as to operations that may execute at least in part in parallel.

Figure 17:
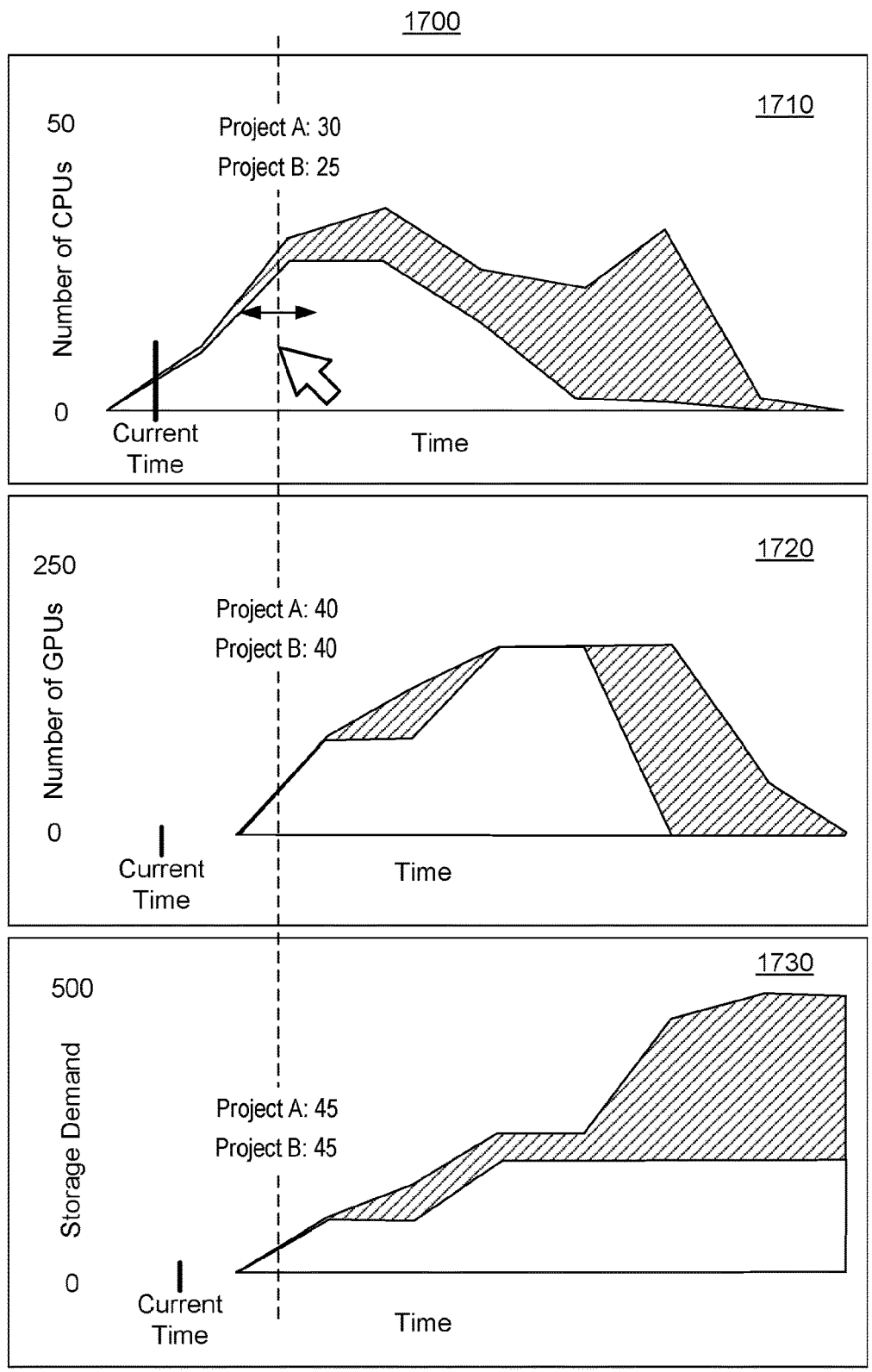
FIG. 17 illustrates a portion of the graphical user interface of FIG. 12.

FIG. 17 shows an example of a GUI 1700 that includes various example plots 1710, 1720, and 1730. In the example of FIG. 17, the plot 1710 can show metrics such as number of CPUs versus time for multiple projects (e.g., Project A and Project B), the plot 1720 can show metrics such as number of GPUs versus time for multiple projects (e.g., Project A and Project B), and the plot 1730 can show metrics such as storage demand versus time for multiple projects (e.g., Project A and Project B).

As an example, the GUI 1700 can render planned information and/or information acquired during execution such as execution information acquired as metrics (e.g., cloud platform API metrics, etc.). As shown, the GUI 1700 can include a graphical control such as a time slider that can be moved from past-times to current time to future times. As an example, where a digital operational plan is adjusted, the information in the GUI 1700 may be adjusted correspondingly. For example, consider a method that includes adjusting a plan based on one or more metrics where the adjusted plan can impact number of cores and/or types of cores utilized with respect to time. In such an example, the plots 1710 and/or 1720 may be adjusted accordingly. As an example, where an adjustment impacts storage demand, the plot 1730 may be adjusted.

Figure 18:
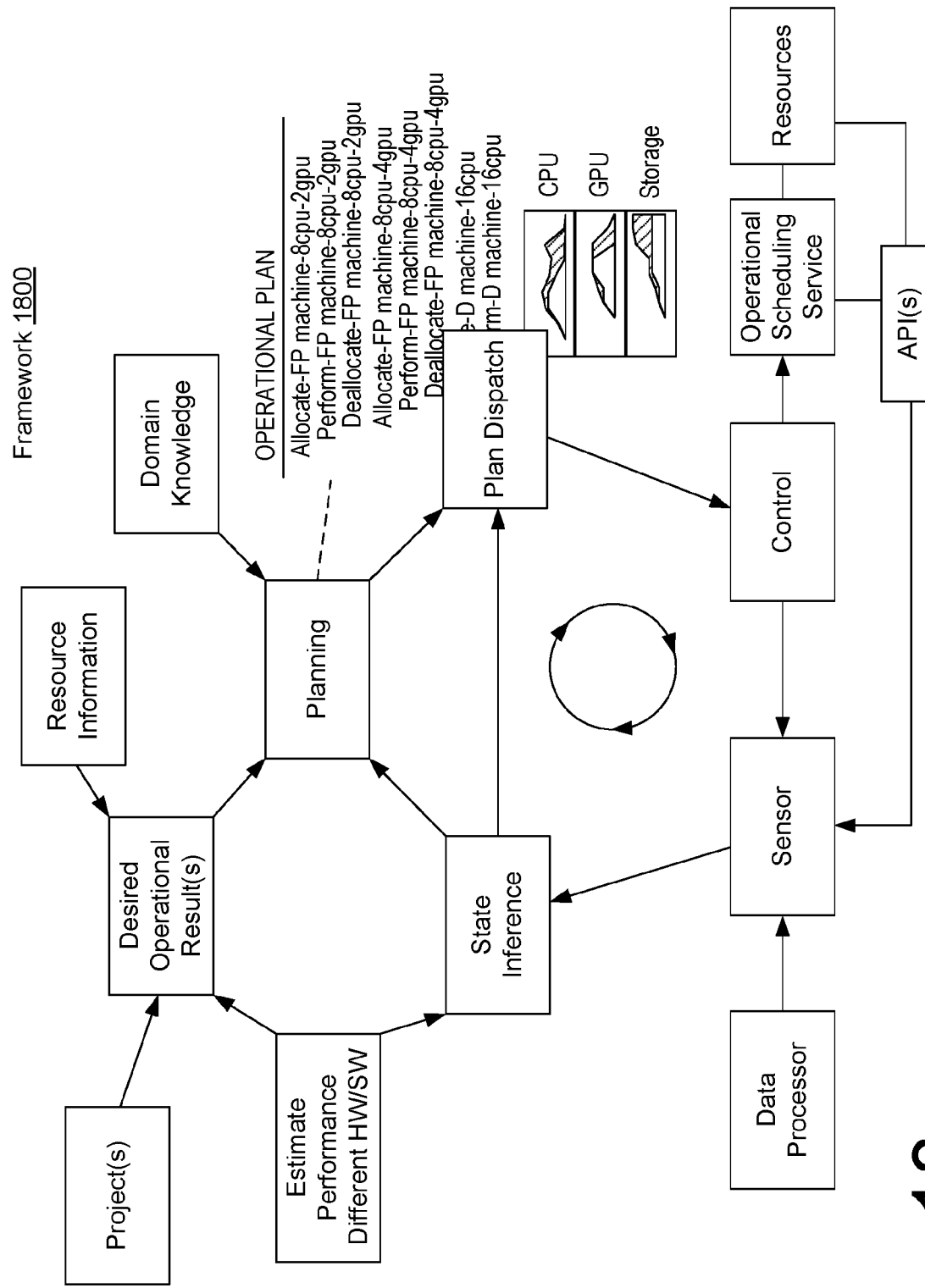
FIG. 18 illustrates an example of a planning framework that can utilize expressions in a PDDL.

FIG. 18 shows an example of a plan-based automation of a seismic processing framework 1800. As shown, where one or more unforeseen events occur (e.g., failure in the compute cluster, storage management, geophysicist on a sick leave), a plan dispatcher may accommodate such failure, if the concrete plan was robust enough (e.g., deadlines were not too tight), or aborts the plan execution and initiates re-planning automatically. Such a computational mechanism can dynamically repair one or more plans, optionally without human intervention.

FIG. 18 illustrates a perpetual loop of dynamic planning, which may be perpetual as to one or more projects. As an example, a framework can aim to drive toward a final state such as, for example, having seismic processing projects completed on time, on budget, accurately for purposes of field operations, etc.

As an example, domain knowledge can formalize a manager's job description into PDDL language (e.g., converting from manual to automated). As an example, a planning (engine) component can use a current state from state inference, goal and domain model and compute a plan. As an example, a plan dispatcher can dispatch actions to controller to execute the plan. As an example, a controller can actuate a cluster/cloud infrastructure executing the plan (see, e.g., FIG. 10). As an example, a sensor or sensors can collect actual metrics of project progress and status of machines in the cloud. As an example, state inference can interpret raw low-level sensor data (e.g. CPU load, available storage size, etc.) and translate it to a higher-level state representation, for example, at the same level on which the PDDL model is defined (e.g. task is executing, task is pending input data from human, etc.).

As an example, a plan dispatcher can subscribe to state updates to confirm commands were successfully submitted, trigger actions due when their pre-conditions are met, fail the current plan, when it is not fit to continue and trigger re-planning, etc.

As an example, the framework 1800 may be implemented in a robust autonomous manner where it receives information (e.g., via monitoring) and issues information to one or more pieces of equipment, in the field, in the cloud, etc. The framework may provide autonomous robust management of compute/human resource allocation.

In the example of FIG. 18, the framework 1800 is illustrated along with various graphical user interfaces. For example, consider the GUI 1600 and the GUI positioned adjacent to the plan dispatch feature of the framework 1800. As shown, the plan dispatch feature (e.g., a dispatcher) can provide for control of jobs such as start, suspend, add node to job (e.g., allocate one or more resources), and remove node from job (e.g., deallocate one or more resources). Various data management operations may be controlled such as move nearline to cold-line or move cold-line to nearline where a line refers to an operational line with respect to a workflow or workflows. As shown, operations can include human-based quality control operations, which may include visualizing information rendered to a GUI to determine whether resources and tasks (e.g., job tasks) are meshing for meeting projects in an appropriate manner (e.g., proper utilization of machine and/or human resources, proper interpretations, proper surveys, scheduling of surveys, etc.).

As to sensing, the framework 1800 can receive information via one or more sensors, for example, via one or more network interfaces. As shown, sensing can include receiving information as to tasks completed, progress of tasks, demand for more processing, quality control completion, etc. As shown, one or more APIs may be utilized to "sense" information such as execution information (e.g., metrics, etc.).

In the example of FIG. 18, the framework 1800 is shown with respect to various projects (e.g., Project A, Project B, etc.). As an example, a project may be specified in a digital format for consumption by the framework 1800, which may include one or more logical constructs as to how a project is to progress (e.g., as to milestones, operations in series, operations in parallel, etc.). As an example, a project may be associated with a budget, which may be a budget for resources available in a cloud of resources. As an example, a project may include associated penalties and/or priorities.

As an example, the framework 1800 can include features for rendering one or more GUIs as to CPU forecasts for one or more projects, GPU forecasts for one or more projects, storage forecasts for one or more projects, etc.

As an example, the framework 1800 may include one or more APIs and/or make calls to one or more devices in a cloud architecture via one or more APIs.

In the example of FIG. 18, the framework 1800 can include a sensing component, a state inference component, a planning component, a plan dispatch component and a control component. As an example, the framework 1800 may be operatively coupled to a goal component and a domain knowledge component. As shown in FIG. 18, the framework 1800 is dynamic in that it responds to information in real-time, which can provide a basis for planning, re-planning, dispatching, controlling, sensing, etc.

As an example, the framework 1800 may receive information such as log information (e.g., logging while drilling, wireline log, etc.), which may be part of or otherwise germane to a seismic interpretation workflow. As an example, the framework 1800 may be operatively coupled to one or more computing systems for downhole tools such that information may be received and processed to generate a plan as to one or more seismic interpretation tasks.

As an example, the framework 1800 may be utilized for one or more workflows that involve or utilize data from microseismic monitoring. In such an example, microseismic energy may be a result of perforations, fracturing, etc. For example, a hydraulic fracturing operation may be performed in a field by perforating tubing and pumping fluid into a formation to cause the formation to fracture and/or reactivate existing fractures for purposes of draining fluid from a reservoir. In such an example, sensing of microseismic energy can be performed where microseismic data can be processed (e.g., as a job, a project, etc.) to determine a location of a fracture, a direction of a fraction away from a well, an increase in an ability to drain fluid from a reservoir, a parameter(s) of a subsequent fracturing process (e.g., another fracturing stage, etc.). As an example, a microseismic monitoring job may be performed in real-time during hydraulic fracturing where results therefrom may be utilized to issue one or more signals to field equipment that may control one or more aspects of the hydraulic fracturing (e.g., proppant concentration and/or type, surfactant concentration and/or type, water pressure, etc.). As an example, the framework 1700 may respond to commencement of an action in the field such as commencement of a perforation task that perforates tubing to allow for passage of fracturing water into a formation. In such an example, the framework 1700 may access microseismic data associated with the perforating and/or associated with the fracturing where resources are provisioned to perform a seismic interpretation workflow for determining one or more aspects of a fracture or fractures generated by one or more hydraulic fracturing operations. As to acquisition of microseismic data (e.g., a type of seismic data), sensors may be surface sensors and/or subsurface sensors (e.g., as in one or more monitoring wells).

Figure 19:
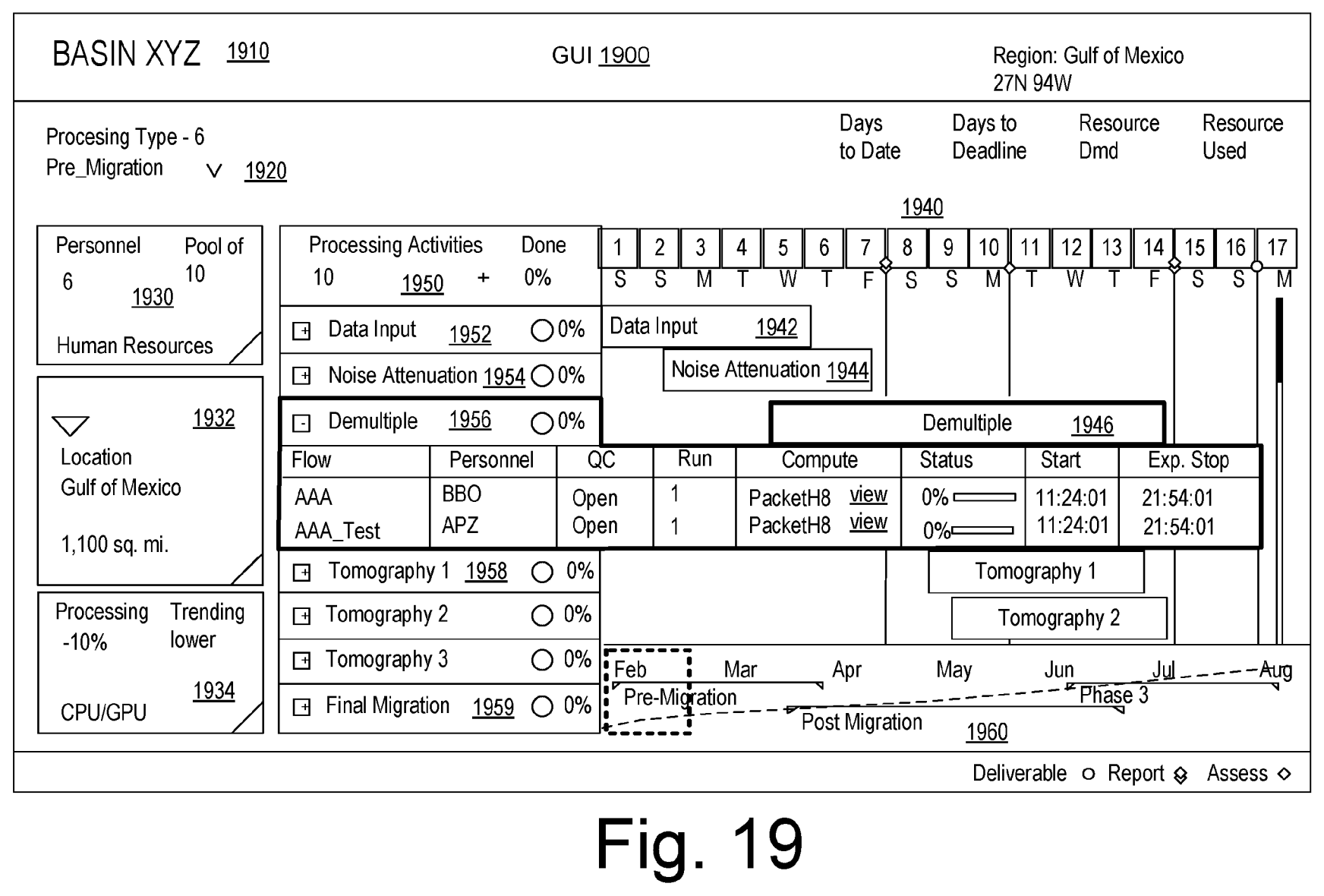

FIG. 19 shows an example of a graphical user interface (GUI) 1900 that includes various panels and/or graphical controls 1910, 1920, 1930, 1932, 1934, 1940, 1942, 1944, 1946, 1950, 1952, 1954, 1956, 1958, 1959 and 1960. The panel 1940 includes days of the month with days of the week and various tasks 1942, 1944, 1946, etc. (see, e.g., Tomography 1 and Tomography 2). The graphical control 1956 is selected, which is for a demultiple tasks that processes seismic data (e.g., noise attenuated seismic data) to attenuate multiples. Various aspects of the demultiple task are illustrated including workflow identifier, person responsible for quality control, compute specifics, status, and start and stop times (e.g., end time). Such aspects can be included in a digital operational plan that can be received by a dispatcher that can generate and/or populate various portions of a GUI such as the GUI 1900. As shown, a window can be selected in the panel 1960 that causes rendering of a corresponding period of a project in the panel 1940, which may populate the fields associated with the panel 1950, which can include real-time information as may be updated via interactions with resources (e.g., API of a cloud platform, etc.).

Figure 20:
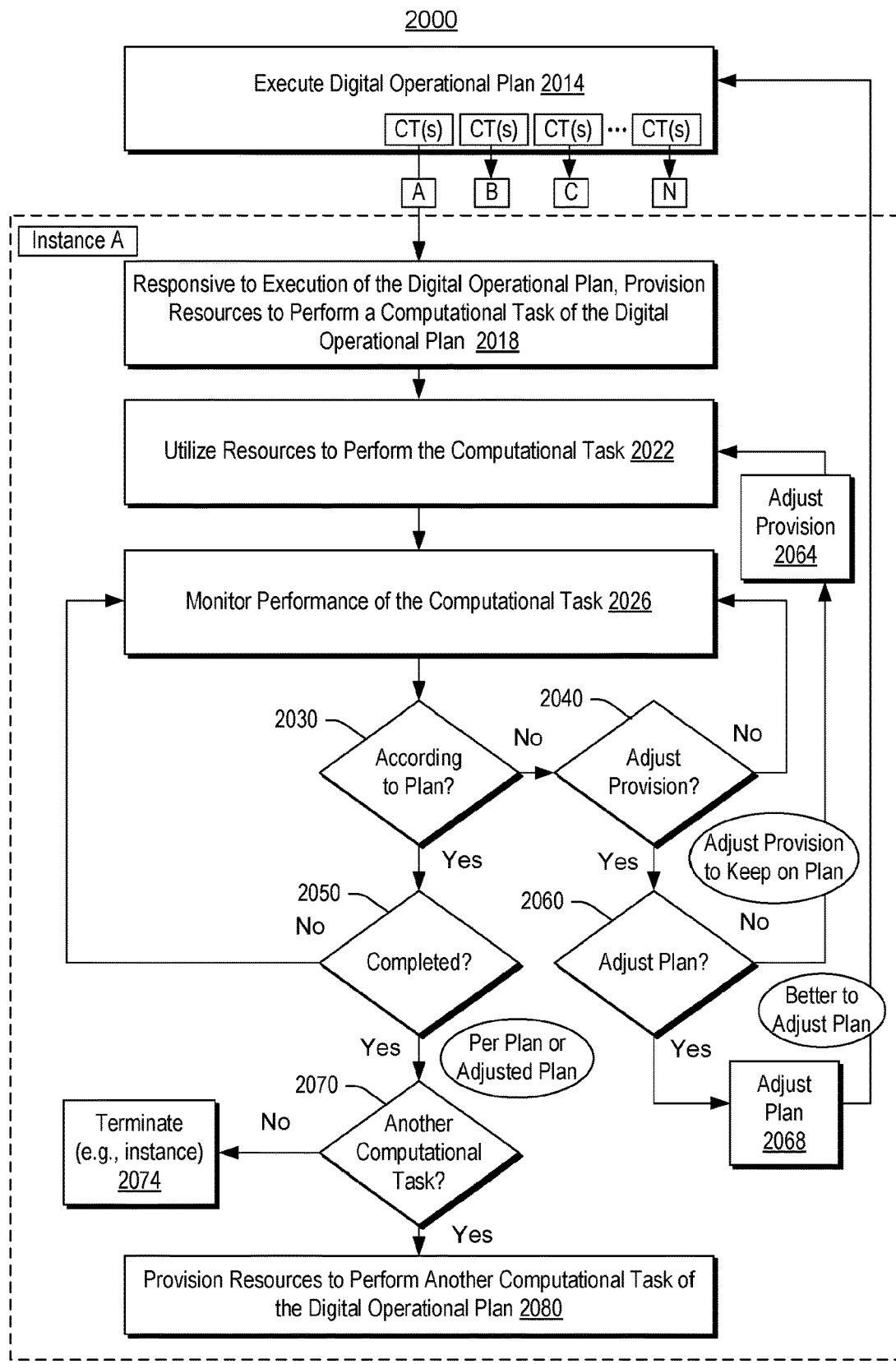
FIG. 20 illustrates an example of a method.

FIG. 20 shows an example of a method 2000 that can perform various actions associated with execution of a digital operational plan, which can include a plurality of computational tasks (CTs), which maybe called for execution in parallel and/or in series. As shown, various CTs can be specified by a digital operational plan where various instances of a method or a portion thereof may be implemented. In the example of FIG. 20, instances such as instances A, B, C to N are illustrated as examples. In such an approach, one or more computations tasks (CTs) can be handled with appropriate provisioning, de-provisioning, etc., of various resources. As explained, one or more revisions can occur, which can include revisions as to allocation (e.g., provisioning), deallocation, (e.g., de-provisioning), a portion of the digital operational plan (e.g., or more than one digital operational plane), a workflow, or workflows, etc. The example of FIG. 20 includes various actions that appear in series, noting that actions may occur in parallel, for example, depending on number of computational tasks being handled by an instance or instances.

As shown in the example of FIG. 20, the method 2000 includes an execution block 2014 for executing at least a portion of a digital operational plan; a provision block 2018 for provisioning resources to perform a computational task (e.g., or optionally tasks) of the portion of the digital operational plan responsive to execution of the digital operational plan; a utilization block 2022 for utilizing resources to perform the computational task (e.g., provisioned resources); a monitor block 2026 for monitoring performance of the computational task (e.g., via monitoring of provisioned resources, etc.); decision blocks 2030, 2040, 2050, 2060 and 2070; a termination block 2074 for terminating at least a portion of a workflow of an operational plan; and another provision block 2080 for provisioning resources to perform another computational task of the digital operational plan (e.g., where the portion of the digital operational plan includes multiple tasks were at least some of the tasks can be performed in series).

As to the decision blocks, the decision block 2030 can decide whether performance is according to the digital operational plan, where, if not, the method 2000 can enter the decision block 2040 for deciding whether to adjust the provisioning (e.g., or continue monitoring without adjusting). Where the decision block 2040 decides to adjust provisioning, the method 2000 may enter the decision block 2060 for deciding whether to adjust the digital operational plan. If the decision is "no", the method 2000 may enter an adjustment block 2064 for adjusting the provisioning and continue at the utilization block 2022; however, where the decision is "yes", the method 2000 may enter an adjustment block 2068 for adjusting the digital operational plan (e.g., one or more portions of the digital operational plan) and continue at the execution block 2014. In such an approach, the decision logic can aim to determine whether it is acceptable to keep "on plan" by adjusting provisioning or whether it is appropriate to adjust the digital operational plan. For example, where an adjustment to provisioning is insufficient to maintain a schedule of the digital operational plan, the adjustment block 2068 may be utilized to adjust the digital operational plan. In such an approach, the decision block 2050 can ascertain whether a task is completed, which may be per the plan or per an adjusted plan. In either instance, an expected schedule may be maintained (see, e.g., the schedule illustrated in the GUI 1900 of FIG. 19). As an example, one or more blocks (e.g., the monitor block 2026, the decision block 2030, the decision block 2050, etc.) can be utilized as a trigger, as appropriate, for data associated with one or more computational tasks being "ready" (e.g., as a result of performing at least one computational task). As an example, data may be "ready" once associated upstream dependencies are adequately handled (e.g., consider a complex computational task with multiple dependencies, etc.). As an example, the decision block 2070 may operate to decide whether one or more other tasks are waiting for the particular task to be completed (e.g., task result, which can be data). In such an example, if the answer is "yes", the method 2000 may return to one of the blocks 2022 or 2026, which may be in another instance (or instances) for the task (or tasks) that depend on the task result. In the example of FIG. 20, for the instance A, the termination block 2074 can be for termination of the instance A, noting that other instances may be executing in series, parallel, etc.

As to the decision block 2070, it can be utilized for deciding whether another computational task is to be performed (e.g., for tasks in series), where, if so, the method 2000 can continue to the provision block 2080 (e.g., and proceed through the method 2000); otherwise, the method 2000 can terminate at the termination block 2074; noting that multiple instances (see, e.g., A, B, C, . . . N) may be executing for handling various computational tasks associated with the digital operational plan where various resources are being provisioned, utilized, de-provisioned, etc., optionally with one or more adjustments to the digital operational plan. As an example, multiple instances can be instantiated of a framework or portions thereof to dynamically handle computational task associated with one or more digital operational plans where, for example, dynamic adjustments (e.g., revisions, etc.) may be called for and performed for one or more of such digital operational plans. As an example, complex dependencies may exist between computational tasks of one or more portions of a digital operational plan and/or one or more digital operational plans. A method such as the method 2000 may be utilized, at least in part, to handle complex dependencies and dynamic provisioning, de-provisioning, re-planning, etc.

In the example of FIG. 20, the monitor block 2026 can include monitoring based on information in the digital operational plan. As mentioned, a dispatcher can issue one or more requests for execution information germane to performance of a task. As a digital operational plan can specify, for example, whether to utilize CPUs and/or GPUs, the monitor block 2026 can issue one or more requests that correspond to such specifications (e.g., issue a GPU API call for one or more GPU related metrics if a task is to be performed using at least one GPU, etc.).

As an example, the method 2000 of FIG. 20 may include executing instructions for rendering one or more graphical user interfaces, for example, consider one or more features of a GUI such as the GUI 1900 of FIG. 19.

As explained, a cloud platform may be utilized in a manner to receive live access as to statuses of various computational resources and various computations as to computational tasks that utilize such computational resources. In such an example, a framework can provide an ability to be flexible with available resources and can forecast demands in terms of computations for different types of workflows, which may be specialized (e.g., via a PDDL approach, etc.). An ability to provision, de-provision, access execution information, etc., can facilitate making informed decisions as to how to best use available resources, for example, to minimize time and/or costs of infrastructure (e.g., based on a formal description of constraints of execution, etc.). As an example, a method can include using a declarative PDDL model, which can facilitate generation of a digital operational plan, for example, as to one or more seismic processing workflows. As an example, a method can include implementing a plan dispatcher, where various actions can be taken to maintain a plan, for example, via provisioning, de-provisioning, etc. and/or where, depending on circumstances, where re-planning (e.g., adjustment(s)) may be performed (e.g., to account for delays, lack of resources, failures as to one or more actions or results, etc.).

Figure 21:
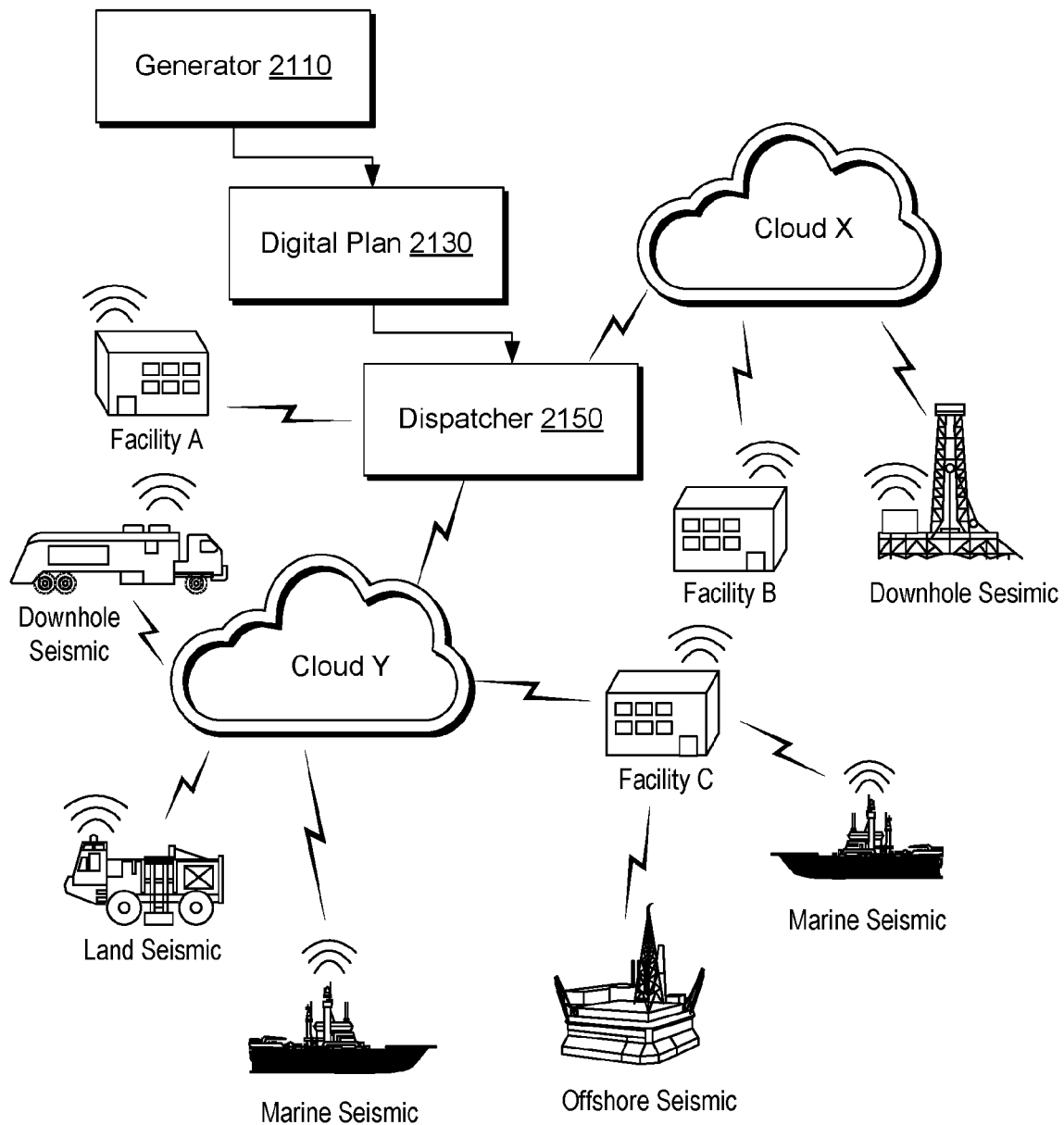
FIG. 21 illustrates an example of a system.

FIG. 21 shows an example of a system 2100 that can include various equipment such as field equipment (e.g., land, downhole, marine seismic equipment) and that can include one or more facilities (e.g., offices, work facilities, laboratories, etc.). Also shown in FIG. 21 are two different cloud environments Cloud X and Cloud Y, which may be associated with different cloud platforms (e.g., GOOGLE, AMAZON, MICROSOFT, etc.).

FIG. 21 shows a generator 2110 that can generate a digital operational plan 2130 and a dispatcher 2150 that can receive the digital operational well plan 2130. As shown, the dispatcher 2150 can coordinate activities in the system 2100 in real time, for example, as data are acquired, analyzed, etc. As an example, the dispatcher 2150 may be a heterogeneous dispatcher that can handle different types of workflows (e.g., as to different types of field equipment, seismic surveys, etc.) and/or different types of cloud platforms.

Figure 22:
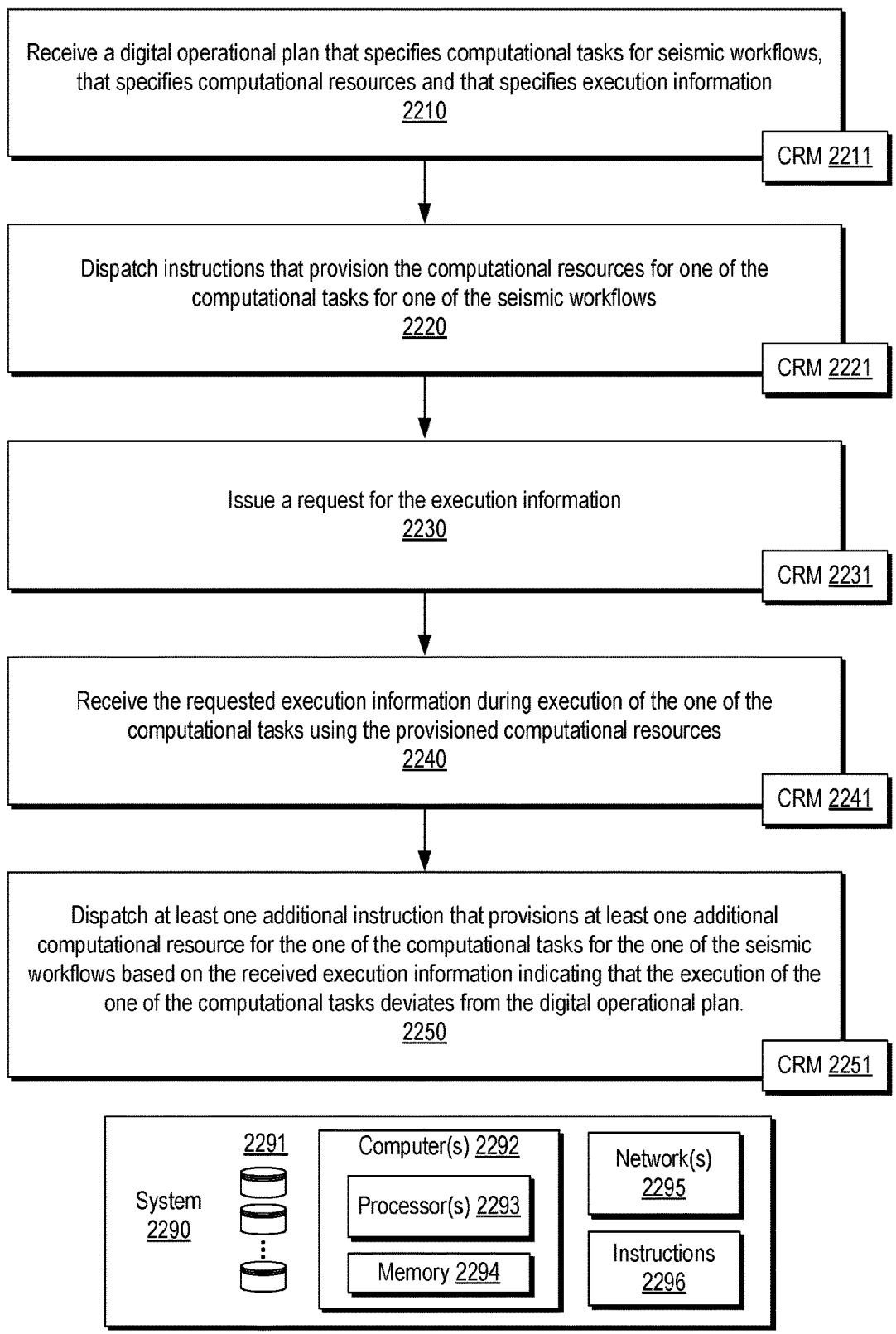
FIG. 22 illustrates an example of a method and an example of a system.

FIG. 22 shows an example of a method 2200 that includes a reception block 2210 for receiving a digital operational plan that specifies computational tasks for seismic workflows, that specifies computational resources and that specifies execution information; a dispatch block 2220 for dispatching instructions that provision the computational resources for one of the computational tasks for one of the seismic workflows; an issuance block 2230 for issuing a request for the execution information; a reception block 2240 for receiving the requested execution information during execution of the one of the computational tasks using the provisioned computational resources; and a dispatch block 2250 for, based on the received execution information indicating that the execution of the one of the computational tasks deviates from the digital operational plan, dispatching at least one additional instruction that provisions at least one additional computational resource for the one of the computational tasks for the one of the seismic workflows.

FIG. 22 also shows various computer-readable media (CRM) blocks 2211, 2221, 2231, 2241, and 2251. Such blocks can include instructions that are executable by one or more processors, which can be one or more processors of a computational framework, a system, a computer, etc. A computer-readable medium can be a computer-readable storage medium that is not a signal, not a carrier wave and that is non-transitory. For example, a computer-readable medium can be a physical memory component that can store information in a digital format.

In the example of FIG. 22, a system 2290 includes one or more information storage devices 2291, one or more computers 2292, one or more networks 2295 and instructions 2296. As to the one or more computers 2292, each computer may include one or more processors (e.g., or processing cores) 2293 and memory 2294 for storing the instructions 2296, for example, executable by at least one of the one or more processors. As an example, a computer may include one or more network interfaces (e.g., wired or wireless), one or more graphics cards, a display interface (e.g., wired or wireless), etc. The system 2290 can be specially configured to perform one or more portions of the method 2200 of FIG. 22.

As an example, plan-based automation of seismic processing, by formalizing the seismic processing rules and procedures that the humans do today combined with one or more planning algorithms, can perform planning at scale that humans could not. For example, consider a framework that can plan operations associated with one or more fields, each of which may span hundreds of square kilometers or more. As an example, consider a framework that can handle North Sea marine operations and/or Arabian Peninsula desert operations. As an example, consider a framework that can handle operations for the Williston Basin and optionally one or more other basins. As an example, a framework may account for national and/or international rules, regulations, data handling, data retention, etc. As an example, a framework may be tailored for handling microseismic data and one or more microseismic interpretation workflows as may be associated with one or more fracturing operations (e.g., perforating, pumping, etc.).

As an example, a framework may be extensible. For example, as frameworks such as the framework 900 of FIG. 9 become available or extended, a planning framework may be extended to manage such additional features for purposes of seismic workflows. As an example, tasks may involve resources in the form of cloud compute power, human-executed tasks, devising plans for well site interventions, minimizing the amount of fuel used in an operation (e.g., land survey, marine survey, drilling, fracturing, etc.).

Currently resources tend to be allocated by experience and fairly conservatively. An automated planning framework can find a more optimal solution faster. As an example, consider processing that fails in the middle of the night, which may block resources until a human operator comes to work to decide whether to re-run the processing or attempt recovery of the intermediate data. A planning framework implemented in the cloud may be robust in that it operates in a substantially autonomous manner and with resources that can be provisioned from a large pool of resources, which may be geographically (e.g., redundant, accessible, provisionable, etc.).

As an example, a system can implement one or more models of operations (e.g., defined with logical pre-conditions and causal effects) such that output can be robustly executable as plans are generated, revised, etc. via a planning framework.

As an example, a PDDL can be an encoding language for planning tasks where components can include objects, predicates as properties of objects (e.g., true or false, fuzzy logic, numeric, complex, etc.), an initial state and goal specifications, as well as actions/operators that can have effect on equipment, processes, etc.

As an example, a method can include expressing a seismic interpretation workflow in a planning domain definition language (PDDL) where the expressed seismic interpretation workflow includes processor-executable instructions; executing the processor-executable instructions; responsive to the executing, provisioning resources; utilizing the provisioned resources to perform one or more of tasks of the seismic interpretation workflow; monitoring performance of the one or more of the tasks of the seismic interpretation workflow; and responsive to the monitoring, determining whether to revise a plan for achieving the seismic interpretation workflow. For example, consider revising (e.g., replanning) allocation of compute resources to handle disruptions in plan execution. As an example, such a method can include, responsive to the monitoring, determining whether to provision one or more additional resources. As an example, monitoring can include sensing, which can include receiving information via one or more interfaces (e.g., network interfaces, etc.).

As an example, a method can include utilizing a PDDL approach to express various possible action in a variety of possible seismic processing workflows (e.g. acquiring data, interpreting, processing, human QC, cloud compute power provisioning, etc.) where, for example, each seismic processing workflow can then pick and choose from a repertoire expressed in PDDL. For example, consider using PDDL to declaratively list choices and under which circumstances they are applicable (e.g., and what effects they provide individually and/or collectively) where a workflow can be a valid combination of such choices.

As an example, a method can include, responsive to monitoring, determining whether to de-provision one or more of the provisioned resources. As an example, provisioning may be allocating and de-provisioning may be deallocating.

As an example, a method can include, responsive to monitoring, scheduling provisioning of resources.

As an example, a seismic interpretation workflow can include one or more seismic survey tasks. For example, consider a seismic survey task that is for distributing sensors in an environment according to an acquisition geometry or, for example, a seismic survey task for towing sensors via a vessel according to a marine survey plan.

As an example, provisioning can include provisioning cloud-based resources. As an example, a method can include utilizing provisioned resources for instantiating a seismic data analysis framework. As an example, one or more instances of such a framework may be instantiated, optionally with different amounts and/or types of resources (e.g., CPUs, GPUs, etc.) depending on particular features of the framework to be utilized, amount of data to be processed, timings, etc.

As an example, a method can include provisioning resources according to a schedule. As an example, a method can include generating a plan, which may include a schedule that is utilized to control provisioning and de-provisioning of resources. As an example, sensing can be utilized in conjunction with a plan, a schedule, etc., for making decisions as to resources, timings, etc., for one or more projects that involve seismic interpretation.

As an example, a method can include generating a schedule for provisioning resources to perform one or more of tasks of a seismic interpretation workflow. In such an example, the method can include revising the schedule based at least in part on monitoring.

As an example, a method can include utilizing provisioned resources to perform one or more of tasks of a seismic interpretation workflow which can include issuing at least one signal to at least one piece of equipment. In such an example, the at least one piece of equipment can be or include at least one piece of field equipment (e.g., acquisition, drilling, etc.).

As an example, a seismic interpretation workflow can include at least one data access tasks that includes accessing seismic data via a network where the seismic data are stored in a storage device operatively coupled to the network. In such an example, the storage device can be a piece of field equipment for performing a seismic survey.

As an example, a system can include a processor; memory operatively coupled to the processor; and processor-executable instructions stored in the memory to instruct the system to: express a seismic interpretation workflow in a planning domain definition language (PDDL) where the expressed seismic interpretation workflow includes processor-executable instructions; execute the processor-executable instructions; responsive to execution of the processor-executable instructions, provision resources; utilize the provisioned resources to perform one or more of tasks of the seismic interpretation workflow; monitor performance of the one or more of the tasks of the seismic interpretation workflow; and, responsive to monitored performance, determine whether to revise the seismic interpretation workflow. As an example, such a system can include processor-executable instructions stored in the memory to instruct the system to, responsive to monitored performance, determine whether to provision one or more additional resources.

As an example, one or more computer-readable storage media can include computer-executable instructions executable to instruct a computing system to: express a seismic interpretation workflow in a planning domain definition language (PDDL) where the expressed seismic interpretation workflow includes processor-executable instructions; execute the processor-executable instructions; responsive to execution of the processor-executable instructions, provision resources; utilize the provisioned resources to perform one or more of tasks of the seismic interpretation workflow; monitor performance of the one or more of the tasks of the seismic interpretation workflow; and, responsive to monitored performance, determine whether to revise the seismic interpretation workflow. In such an example, the one or more computer-readable storage media can include computer-executable instructions executable to instruct a computing system to: responsive to monitored performance, determine whether to provision one or more additional resources.

As an example, a method can include receiving a digital operational plan that specifies computational tasks for seismic workflows, that specifies computational resources and that specifies execution information; dispatching instructions that provision the computational resources for one of the computational tasks for one of the seismic workflows; issuing a request for the execution information; receiving the requested execution information during execution of the one of the computational tasks using the provisioned computational resources; and, based on the received execution information indicating that the execution of the one of the computational tasks deviates from the digital operational plan, dispatching at least one additional instruction that provisions at least one additional computational resource for the one of the computational tasks for the one of the seismic workflows. In such an example, the generating the digital operational plan can be by expressing the seismic workflows in a planning domain definition language (PDDL).

As an example, in a method, execution of one of a plurality of computational tasks may deviate from a digital operational plan by lagging behind a time specified in the digital operational plan. In such an example, the method may provision one or more additional computational resources for use in expediting the computational task, optionally in a manner that results in the computational task being executed in an amount of time that is closer to a planned amount of time and optionally less than a planned amount of time (e.g., to assure that the computational task does not interfere with planned timings, etc.).

As an example, a method can include determining that, using at least one additional computation resource, execution of one of a plurality of computational tasks still deviates from the digital operational plan. In such an example, responsive to the determining, the method can include adjusting the digital operational plan. As an example, an adjustment may aim to adjust resources provisioned for one or more other computational tasks (e.g., whether executing or to execute). Such an approach can aim to maintain adherence to a digital operational plan where some flexibility exists, particularly with respect to computational task interdependencies, expected wait times (e.g., waiting for a task result), etc.

As an example, a method can include rendering a timeline to a display that includes timings for at least a portion of a plurality of computational tasks. In such an example, the rendered timeline can provide for visualization of various tasks, which may be executed, executing, to execute, etc. As an example, a method can include rendering a graphical user interface (GUI) that can be interrogated as to various computational tasks and/or one or more other aspects of a digital operational plan (e.g., or plans). As an example, a GUI may illustrate dependencies that exist between various tasks and a timeline with information as to status (e.g., on-time, scheduled at, waiting, to be completed by, etc.). As an example, where a GUI is rendered, a method may, for example, responsive to actuation of a graphical control for one of a plurality of computational tasks, include rendering information to a display based on at least a portion of execution information for that one computational task and/or for one or more computational tasks that may be associated therewith.

As an example, a method can include rendering a computational trend indicator to a display for a computational task where the computational trend indicator is based on at least a portion of execution information (e.g., as provided via one or more API calls, one or more computational tasks being completed with available task results, one or more computational tasks being initiated, etc.).

As an example, a computational trend indicator can indicate whether execution of a particular computational task is slowing down or speeding up. As an example, a plot may be rendered that shows a history of rates for a computational task or computational tasks. For example, consider a plot with a null value where different computational tasks may be rendered using different colors, marker styles, line types, etc., where deviations upwardly may indicate faster execution and deviations downwardly may indicate slower execution. In such a graphic, a completion time estimate may be rendered to show how completion time is impacted and, for example, dependencies may be rendered to indicate what other computational task or tasks may depend on a task result (e.g., completion).

As an example, a method can include issuing a request using an application programming interface (API) call. For example, a cloud platform can include one or more APIs that can be called and return information in response. As an example, a method can include making such calls on a particular basis (e.g., time intervals) and/or in response to one or more events (e.g., from a digital operational plan being revised, from completion of a computational task, etc.).

As an example, provisioned computational resources can include at least one graphics processing unit as specified in a digital operational plan. In such an example, a method can request execution information that includes information associated with operation of the at least one graphics processing unit (e.g., consider an API call to an API that handles GPUs, etc.).

As an example, a method can include determining whether to de-provision one or more of provisioned computational resources. For example, where a computational task is completed, de-provisioning can be called for to release a computational resource. As an example, where a computational task is to execute in part in parallel to be followed by in part in series, a method may release one or more processors that were provisioned for performing the part in parallel once that part is completed.

As an example, a method can include scheduling provisioning of computational resources. In such an example, scheduling may occur in a dynamic manner that depends on execution information for one or more computational tasks of a digital operational plan or plans.

As an example, a seismic interpretation workflow can include a seismic survey task. For example, consider a seismic survey task that includes distributing sensors in an environment according to an acquisition geometry and/or that includes towing sensors via a vessel according to a marine survey plan. As an example, one or more vessels, one or more vehicles, etc., may be utilized where, for example, operation thereof may be at least in part via GPS or other control for direction (e.g., navigation, stopping, starting, etc.). In such an example, control parameters may be determined using provisioned computational resources where the control parameters may be streamed (e.g., via wire, wirelessly, etc.) to a vessel, a vehicle, a drone, etc., to cause controlled action thereof. As an example, a digital operational plan can include one or more computational tasks associated with surveying.

As an example, a method can include provisioning cloud-based computational resources. In such an example, provisioning may occur via one or more types of calls (e.g., requests), which may be via one or more APIs, etc. For example, a method can include making an API call to provision a processor, processors, memory, etc., for performing a computational task or tasks.

As an example, a method can include instantiating a seismic data analysis framework. Such a framework may utilize computational resources that can be provisioned, de-provisioned, etc., where, for example, utilization of such resources may be monitored (e.g., via one or more requests, etc.).

As an example, a method can include issuing at least one signal to at least one piece of field equipment. As mentioned, field equipment may be associated with a survey (e.g., sources, receivers, vehicles, vessels, drones, etc.).

As an example, a method can include performing actions of a seismic workflow that includes at least one data access task that includes accessing seismic data via a network where the seismic data are stored in a storage device operatively coupled to the network. In such an example, the storage device may be a piece of field equipment for performing a seismic survey.

As an example, a system can include a processor; memory operatively coupled to the processor; and processor-executable instructions stored in the memory to instruct the system to: receive a digital operational plan that specifies computational tasks for seismic workflows, that specifies computational resources and that specifies execution information; dispatch instructions that provision the computational resources for one of the computational tasks for one of the seismic workflows; issue a request for the execution information; receive the requested execution information during execution of the one of the computational tasks using the provisioned computational resources; and, based on the received execution information indicating that the execution of the one of the computational tasks deviates from the digital operational plan, dispatch at least one additional instruction that provisions at least one additional computational resource for the one of the computational tasks for the one of the seismic workflows.

As an example, one or more computer-readable storage media can include computer-executable instructions executable to instruct a computing system to: receive a digital operational plan that specifies computational tasks for seismic workflows, that specifies computational resources and that specifies execution information; dispatch instructions that provision the computational resources for one of the computational tasks for one of the seismic workflows; issue a request for the execution information; receive the requested execution information during execution of the one of the computational tasks using the provisioned computational resources; and, based on the received execution information indicating that the execution of the one of the computational tasks deviates from the digital operational plan, dispatch at least one additional instruction that provisions at least one additional computational resource for the one of the computational tasks for the one of the seismic workflows.

As an example, a workflow may be associated with various computer-readable medium (CRM) blocks. Such blocks generally include instructions suitable for execution by one or more processors (or cores) to instruct a computing device or system to perform one or more actions. As an example, a single medium may be configured with instructions to allow for, at least in part, performance of various actions of a workflow. As an example, a computer-readable medium (CRM) may be a computer-readable storage medium that is non-transitory, not a carrier wave and not a signal. As an example, blocks may be provided as one or more sets of instructions, for example, such as the one or more sets of instructions 270 of the system 250 of FIG. 2.

Figure 23:
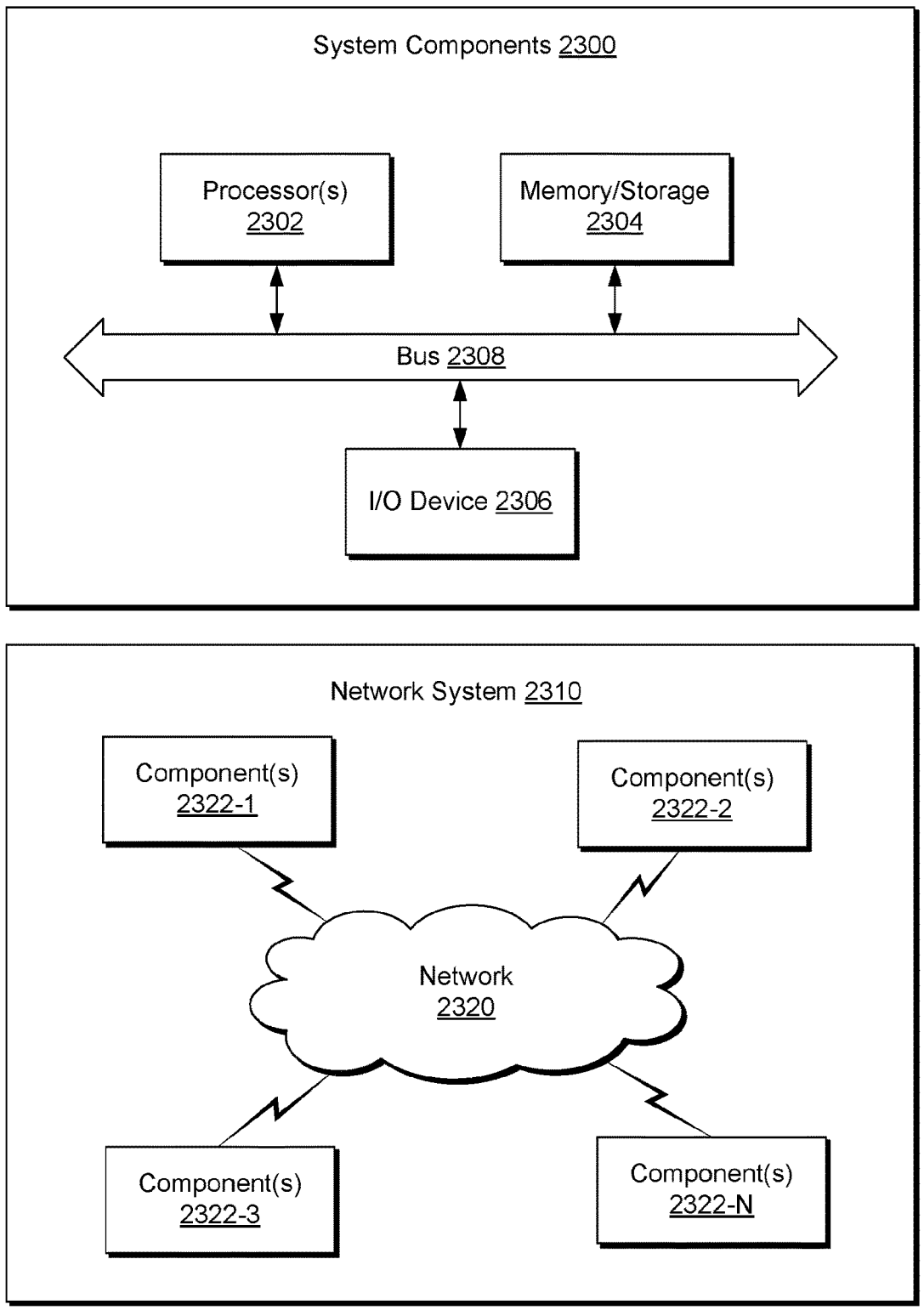
FIG. 23 illustrates example components of a system and a networked system.

FIG. 23 shows components of an example of a computing system 2300 and an example of a networked system 2310 that includes a network 2320. The system 2300 includes one or more processors 2302, memory and/or storage components 2304, one or more input and/or output devices 2306 and a bus 2308. In an example embodiment, instructions may be stored in one or more computer-readable media (e.g., memory/storage components 2304). Such instructions may be read by one or more processors (e.g., the processor(s) 2302) via a communication bus (e.g., the bus 2308), which may be wired or wireless. The one or more processors may execute such instructions to implement (wholly or in part) one or more attributes (e.g., as part of a method). A user may view output from and interact with a process via an I/O device (e.g., the device 2306). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 2310. The network system 2310 includes components 2322-1, 2322-2, 2322-3, . . . 2322-N. For example, the components 2322-1 may include the processor(s) 2302 while the component(s) 2322-3 may include memory accessible by the processor(s) 2302. Further, the component(s) 2302-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
   receiving a digital operational plan that specifies computational tasks for seismic workflows, that specifies computational resources, and that specifies execution information metrics, wherein the digital operational plan is generated by a computational planning framework, and wherein the seismic workflows comprise one or more manual seismic interpretation tasks;
   via a plan dispatcher, dispatching instructions that provision the computational resources for one of the computational tasks for one of the seismic workflows;
   issuing a request for one or more values for the execution information metrics;
   receiving the requested one or more values during execution of the one of the computational tasks using the provisioned computational resources;

based on the received one or more values indicating that the execution of the one of the computational tasks deviates from the digital operational plan, automatically dispatching at least one additional instruction that provisions at least one additional computational resource for the one of the computational tasks for the one of the seismic workflows;

automatically determining that, using the at least one additional computational resource, the execution of the one of the computational tasks still deviates from the digital operational plan; and responsive to the determining, automatically aborting the digital operational plan and instructing the computational planning framework to re-plan the digital operational plan.

2. The method of claim 1 comprising generating the digital operational plan by expressing the seismic workflows via a planning domain definition language (PDDL).

3. The method of claim 1 wherein the execution of the one of the computational tasks deviates from the digital operational plan by lagging behind a time specified in the digital operational plan.

4. The method of claim 3, wherein the lagging behind a time specified in the digital operational plan delays at least one of the one or more manual seismic interpretation tasks.

5. The method of claim 1, wherein the automatically determining determines that a human assigned to at least one of the one or more manual seismic interpretation tasks is unavailable.

6. The method of claim 1 comprising rendering a timeline to a display that comprises timings for at least a portion of the computational tasks.

7. The method of claim 6 comprising, responsive to actuation of a graphical control for one of the computational tasks, rendering information to a display based on at least a portion of the execution information.

8. The method of claim 1 comprising rendering a computational trend indicator to a display for the one of the computational tasks wherein the computational trend indicator is based on at least one of the one or more values, wherein the computational trend indicator indicates whether execution of the one of the computational tasks is slowing down or speeding up.

9. The method of claim 1 wherein the issuing a request comprises issuing an application programming interface (API) call.

10. The method of claim 1 wherein the provisioned computational resources comprise at least one graphics processing unit as specified in the digital operational plan and wherein the requested one or more values comprise information associated with operation of the at least one graphics processing unit.

11. The method of claim 1 comprising determining whether to de-provision one or more of the provisioned computational resources.

12. The method of claim 1 comprising scheduling provisioning of computational resources.

13. The method of claim 1 wherein the seismic workflows comprise a seismic survey task.

14. The method of claim 13 wherein the seismic survey task comprises distributing sensors in an environment according to an acquisition geometry.

15. The method of claim 1 wherein the at least one additional instruction provisions cloud-based computational resources.

16. The method of claim 1 comprising instantiating a seismic data analysis framework.

17. The method of claim 1 comprising issuing at least one signal to at least one piece of field equipment.

18. The method of claim 1 wherein at least one of the seismic workflows comprises at least one data access task that comprises accessing seismic data via a network wherein the seismic data are stored in a storage device operatively coupled to the network.

19. A system comprising:
a processor;
memory operatively coupled to the processor; and
processor-executable instructions stored in the memory to instruct the system to:
receive a digital operational plan that specifies computational tasks for seismic workflows, that specifies computational resources and that specifies execution information metrics, wherein the digital operational plan is generated by a computational planning framework, and wherein the seismic workflows comprise one or more manual seismic interpretation tasks;
via a plan dispatcher, dispatch instructions that provision the computational resources for one of the computational tasks for one of the seismic workflows;
issue a request for one or more values of the execution information metrics;
receive the requested one or more values during execution of the one of the computational tasks using the provisioned computational resources;
based on the received one or more values indicating that the execution of the one of the computational tasks deviates from the digital operational plan, dispatch at least one additional instruction that provisions at least one additional computational resource for the one of the computational tasks for the one of the seismic workflows;
automatically make a determination that, using the at least one additional computational resource, the execution of the one of the computational tasks still deviates from the digital operational plan; and
responsive to the determination, automatically abort the digital operational plan and instruct the computational planning framework to re-plan the digital operational plan.

20. One or more non-transitory computer-readable storage media comprising computer-executable instructions executable to instruct a computing system to:
receive a digital operational plan that specifies computational tasks for seismic workflows, that specifies computational resources and that specifies execution information metrics, wherein the digital operational plan is generated by a computational planning framework, and wherein the seismic workflows comprise one or more manual seismic interpretation tasks;
via a plan dispatcher, dispatch instructions that provision the computational resources for one of the computational tasks for one of the seismic workflows;
issue a request for one or more values for the execution information metrics;
receive the requested one or more values during execution of the one of the computational tasks using the provisioned computational resources;
based on the received one or more values indicating that the execution of the one of the computational tasks deviates from the digital operational plan, dispatch at least one additional instruction that provisions at least one additional computational resource for the one of the computational tasks for the one of the seismic workflows;
automatically make a determination that, using the at least one additional computational resource, the execution of the one of the computational tasks still deviates from the digital operational plan; and
responsive to the determination, automatically abort the digital operational plan and instruct the computational planning framework to re-plan the digital operational plan.

\* \* \* \* \*